(12) United States Patent
Davidson et al.

(10) Patent No.: US 12,552,650 B2
(45) Date of Patent: Feb. 17, 2026

(54) HANDS FREE ADVANCE CONTROL FOR MATERIAL HANDLING VEHICLE

(71) Applicant: Bastian Solutions, LLC, Indianapolis, IN (US)

(72) Inventors: Elizabeth Nicole Davidson, Arlington, TX (US); Tiffany Lee Greyson, Boise, ID (US); Joshua Robert Olds, Boise, ID (US); Akash Madhu Jinandra, Boise, ID (US); Garrett Scot Yesmunt, Indianapolis, IN (US); Peter Daum, Indianapolis, IN (US); Wankun Sirichotiyakul, Boise, ID (US); Makarand Shyam Mandolkar, Boise, ID (US); Paola Andrea Gutierrez Guzman, Boise, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 129 days.

(21) Appl. No.: 18/540,043

(22) Filed: Dec. 14, 2023

(65) Prior Publication Data

US 2024/0199392 A1 Jun. 20, 2024

Related U.S. Application Data

(60) Provisional application No. 63/387,632, filed on Dec. 15, 2022.

(51) Int. Cl.
*B66F 9/075* (2006.01)
*G05D 1/222* (2024.01)
(Continued)

(52) U.S. Cl.
CPC ......... *B66F 9/07581* (2013.01); *G05D 1/222* (2024.01); *G05D 1/2446* (2024.01);
(Continued)

(58) Field of Classification Search
None
See application file for complete search history.

(56) References Cited

U.S. PATENT DOCUMENTS

| | | | |
|---|---|---|---|
| 5,610,815 A | 3/1997 | Gudat et al. | |
| 5,859,517 A | 1/1999 | DePasqua | |

(Continued)

FOREIGN PATENT DOCUMENTS

| | | | |
|---|---|---|---|
| CN | 105259898 A | 1/2016 | |
| CN | 105446162 A | 3/2016 | |

(Continued)

OTHER PUBLICATIONS

PCT, Int. App. No. PCT/US2023/084044 International Search Report, 7 pages, Apr. 24, 2024.

(Continued)

*Primary Examiner* — Tamara L Weber
(74) *Attorney, Agent, or Firm* — Woodard, Emhardt, Henry, Reeves & Wagner, LLP

(57) ABSTRACT

A system has been developed to facilitate hands-free autonomous control of material handling equipment or vehicles, such as forklifts and pallet trucks. The system has been designed to facilitate visual tracking by the automated vehicle and further facilitates voice commands. In some use cases, visual tracking is only used, and in other cases only voice commands are used. In other cases, both visual tracking and voice commands are used to control the material handling vehicle. For visual tracking, one or more cameras are configured to capture one or more images of a fiducial. In one case, the vehicle moves, turns, and/or stops based on the movement of the fiducial. For voice control, the operator provides voice commands via a voice controller.

(Continued)

The voice controller converts the voice commands to vehicle control commands that are sent to a remote receiver unit (RRU) in the vehicle.

42 Claims, 15 Drawing Sheets

(51) Int. Cl.
  *G05D 1/244* (2024.01)
  *G05D 1/617* (2024.01)
  *G05D 105/20* (2024.01)
  *G05D 111/10* (2024.01)
  *G05D 111/30* (2024.01)

(52) U.S. Cl.
  CPC ......... *G05D 1/617* (2024.01); *G05D 2105/20* (2024.01); *G05D 2111/10* (2024.01); *G05D 2111/32* (2024.01)

(56) References Cited

U.S. PATENT DOCUMENTS

| | | | |
|---|---|---|---|
| 6,481,525 | B1 | 11/2002 | Bloch et al. |
| 6,548,982 | B1 | 4/2003 | Papanikolopoulos et al. |
| 6,681,638 | B2 | 1/2004 | Kazerooni et al. |
| 7,017,689 | B2 | 3/2006 | Gilliland et al. |
| 8,072,309 | B2 | 12/2011 | Kraimer et al. |
| 8,193,903 | B2 | 6/2012 | Kraimer et al. |
| 8,970,363 | B2 | 3/2015 | Kraimer et al. |
| 9,059,777 | B2 | 6/2015 | Shattuck et al. |
| 9,082,293 | B2 | 7/2015 | Wellman et al. |
| 9,122,276 | B2 | 9/2015 | Kraimer et al. |
| 9,207,673 | B2 | 12/2015 | Pulskamp et al. |
| 9,649,766 | B2 | 5/2017 | Stubbs et al. |
| 9,713,871 | B2 | 7/2017 | Hill et al. |
| 9,948,917 | B2 * | 4/2018 | Inacio De Matos .... G06F 3/041 |
| 11,537,119 | B2 | 12/2022 | Bastian, II et al. |
| 11,590,997 | B1 * | 2/2023 | Bhaskaran ............ B62B 3/1424 |
| 2002/0138936 | A1 | 10/2002 | Takeuchi et al. |
| 2004/0180631 | A1 | 9/2004 | Lim et al. |
| 2005/0247508 | A1 | 11/2005 | Gilliland et al. |
| 2008/0071429 | A1 | 3/2008 | Kraimer et al. |
| 2011/0295399 | A1 | 12/2011 | Plociennik et al. |
| 2017/0334644 | A1 | 11/2017 | Otto et al. |
| 2017/0334696 | A1 * | 11/2017 | Otto ........................ B66F 9/18 |
| 2018/0164818 | A1 | 6/2018 | Wilkinson et al. |
| 2018/0354140 | A1 | 12/2018 | Watanabe |
| 2019/0137991 | A1 | 5/2019 | Agarwal |
| 2020/0326699 | A1 | 10/2020 | Bastian, II et al. |
| 2021/0072763 | A1 * | 3/2021 | Chen .................... G05D 1/0212 |
| 2021/0232148 | A1 | 7/2021 | Sui et al. |
| 2022/0267131 | A1 * | 8/2022 | Magzimof .......... B66F 9/07581 |

FOREIGN PATENT DOCUMENTS

| | | |
|---|---|---|
| CN | 106950951 B | 7/2017 |
| JP | 2004268151 A | 9/2004 |
| WO | 2009155948 A1 | 12/2009 |

OTHER PUBLICATIONS

PCT, Int. App. No. PCT/US2023/084044 Written Opinion of the Internationational Searching Authority, 8 pages, Apr. 24, 2024.

Fezari et al., A Voice Command System for Autonomous Robots Guidance; 9th IEEE Intl. Workshop on Advanced Motion Control, 2006; Istanbul, Turkey; pp. 261-265, 5 pages, Jan. 1, 2006.

Correa et al., Multimodel Interaction with an Autonomous Forklift; 2010 5th ACM/IEEE Intl. Conf. on Human-Robot Interaction (HR); Osaka Japan, 2010; pp. 243-250, 8 pages, Jan. 1, 2010.

Teller et al., A voice-commandable robotic forklift working alongside humans in minimally-prepared outdoor environments, IEEE International Conference on Robotics and Automation, (2010), pp. 526-533., 8 pages, May 3, 2010.

Nguyen et al., Control of Autonomous Mobile Robot using Voice Command; Proceedings of the ARW & OAGM Workshop 2019; pp. 123-127, 5 pages, Jan. 1, 2019.

* cited by examiner

HANDS FREE ADVANCE CONTROL FOR MATERIAL HANDLING VEHICLE

CROSS REFERENCE TO RELATED APPLICATIONS

This application claims the benefit of U.S. Patent Application No. 63/387,632, filed Dec. 15, 2022, which is hereby incorporated by reference.

BACKGROUND

Material handling can be a laborious process. In one common material handling task, an operator uses a pallet jack carrying a pallet on which items, such as boxes or other containers, are loaded and unloaded. The operator travels up and down various aisles unloading and loading items onto the pallet jack. As the operator moves along the aisle, the operator has to pull the pallet jack to the new location. While pallet jacks are now motorized so as to relieve some of the effort, the operator still has to travel to the handle, pull the pallet jack, and then reposition themselves to pick or place the next item.

Thus, there is a need for improvement in this field.

SUMMARY

As noted, material handling can be a laborious and time-consuming process. For example, order picking is a repetitive and time-consuming activity in which the operators frequently hop on and off motorized pallet jacks or forklift trucks to pick goods and afterwards move the truck to the next picking location. As a result, it was discovered that low productivity was created with such systems. Systems have been developed in which a remote-controlled forklift or electric pallet truck is remotely controlled via a hand operated remote control or glove type device. While using such remote hand operated controls has somewhat enhanced productivity, the hand controls still make the picking process difficult as the operator performing the picking or placing operation is somewhat hampered by handling the hand control as the hands of the operator are typically used to handle the items. In other words, such remote-controlled systems require the hands to be used while using the remote control. This in turn hinders the use of the hands of the operator during the picking or placing operation, which in turn results in a waste of time and productivity.

A unique system and technique have been developed to address these as well as other issues. In particular, the system facilitates hands-free control of material handling equipment or vehicles, such as forklifts and pallet trucks. The system has been designed to facilitate visual tracking by the automated vehicle and further facilitates voice commands. In some use cases, visual tracking is only used, and in other cases only voice commands are used. It is envisioned that in some cases both visual tracking and voice commands are used to control the material handling vehicle, like the pallet jack or forklift truck.

In the visual tracking approach, a computer vision and image processing system is used to track and identify a unique operator through a machine-readable visual indicator, such as a barcode (e.g., a QR code). The operator wears a fiducial that includes the barcode. While the techniques and systems will be described with reference to using a fiducial, it should be recognized that other types of markers can be used in other examples. Once the barcode is visualized, the material handling equipment is able to track and monitor the motion of the operator. While the operator is within a specified zone, which is sometimes called an advance zone, the vehicle moves along with the operator as the operator performs their material handling duties. Once the operator is outside of the advance zone, turns in such a way that the barcode is no longer visible, and/or does not move, the material handling equipment remains stationary so that the operator is able to pick and/or place items onto the vehicle. Using fiducial tracking ensures that only a unique operator is able to move the vehicle, and the vehicle is not accidentally moved when other personnel are present within the advance zone. Using such unique barcodes also ensures that more robust sensing occurs under variable lighting conditions, which is common in warehouse and manufacturing environments. Moreover, the use of barcodes is a less computationally expensive process which in turn facilitates quicker and less expensive implementation of the visual tracking technique. In further examples, the vehicle can alternatively or additionally recognize other types of markers besides barcodes, and the depth detection techniques with this system can be used to identify these other types of markers or even human operators.

Depth information is able to be easily obtained at relatively low frame rates (e.g., 30 Hertz), and this in turn can help with implementing the tracking process with common camera equipment. However, it was found that the camera frame rate still needs to be high enough so that the proper depth perception can be determined for detecting motion. The camera, which is used to facilitate this visual detection method, in some cases is initially calibrated so as to readily facilitate identification of the fiducial. In other examples, the factory calibration of the camera is sufficient for identifying the fiducial. The camera should have a sufficient field of view of the advance zone so as to identify the fiducial when within the advance zone. In one use case, ArUco markers are used as the barcode on the fiducial. It was found that ArUco marker tracking has a depth tolerance within about +5 mm when camera calibration is used. Moreover, ArUco markers provide six-dimensional (6D) pose estimation of the fiducial marker with respect to the camera.

The fiducial marker is commonly worn by the operator, but in some cases, it is envisioned that the operator could carry such a marker. In one example, the fiducial marker is placed on a protective personnel equipment (PPE) vest, but in other examples, the marker can be placed elsewhere, such as on a hat or jacket. The fiducial marker can be attached to the article of clothing, such as through hook and loop fasteners or snap fasteners, to name just a few examples.

Once more, it was found that this visual tracking technique using the fiducial marker provided a robust manner in which to detect movement of the individual that was not computationally significant. It is envisioned that this fiducial tracking technique can be used in other circumstances. For example, this six-dimensional pose estimation or fiducial tracking method can be used by drones or other material handling equipment, such as automated guided vehicles (AGVs), to handle packages having the fiducial marker, such as on a label. In certain aspects, the material handling equipment also provides guide beams that help locate the advance zone for the operator so that the operator knows where their position is relative to the advance zone for automatically controlling the equipment in a hands-free manner. The system is designed also to facilitate pairing with the fiducial marker to prevent accidental autonomous operation. For instance, the fiducial marker may contain a unique identifier, such as a serial number, which can be used to pair the marker with a particular piece of equipment, such as a pallet truck or forklift truck. Once paired, the equipment only recognizes an operator having the paired fiducial.

Alternatively or additionally, the system is configured to facilitate voice control. For example, a microphone type device is worn by the operator. When the voice controller detects a unique spoken wake word and/or command, the voice controller is able to send the command to the material handling vehicle so as to stop the vehicle, move the vehicle, turn the vehicle, or perform some other action. The voice controller can for example include a headset, a lapel microphone, and/or a clip-on microphone type device. A command word or phrase can be used in certain circumstances to indicate the direction and/or speed at which the vehicle should move. The voice controller is typically kept in the possession of the operator at all times when the vehicle is in an automated mode. The voice controller in one form communicates with the vehicle through a short-range communication protocol, such as via the Bluetooth® or ZigBee® protocols. The voice controller is typically powered via a battery, and in some situations, it was found that the voice controller should be battery powered for up to at least eight hours of continuous use. The voice controller also can provide other types of feedback, such as via a buzzer, speaker, and/or flashing lights, so the voice controller is able to acknowledge commands being recognized as well as provide status of the voice controller. For example, once a wake word and/or command is recognized, the voice control device provides feedback to acknowledge that the command was received. For instance, a light emitting diode (LED) can flash twice and/or generate an audible sound to indicate that the command was accepted.

To promote safety, the system includes a number of features to prevent unintended continuous motion of the vehicle. For instance, the system in one variation has a maximum drive distance upon a voice command being issued. Moreover, a specific timeout duration in some cases is used to limit the motion of the vehicle, and a pause or stop command can be used without the need of a wake word. In some cases, the voice control device further includes a stop button to prevent motion upon the button being pressed.

To promote adoption, the system has been designed to facilitate easy retrofitting to pre-existing material handling equipment, such as electrically powered pallet trucks and forklift trucks. In one case, for both voice and visual control, the hands-free system mimics the commands that are used by a traditional remote hand controller. In other words, the system converts the voice command to one of the common or traditional vehicle control commands that are sent by a hand remote control and likewise does the same for visual tracking. In other cases, the system can be designed in such a way to be integrated into the original equipment without the need for any type of retrofitting of earlier designs. It is envisioned that this system and method can be integrated into original equipment manufacturer (OEM) material handling equipment, retrofitted into pre-existing equipment designs, or installed as an aftermarket product.

In one use case scenario, the system is integrated into an already existing production pallet truck and is installed as an add on to the pallet truck. For instance, the pre-existing pallet truck design can include obstacle detection sensors, rack following type sensors, adjustable safety fields, and/or a control panel that delivers error alerts to the operator. In other words, this system is able to convert a hand remote control type system to a completely hands-free type of system for semi-autonomous control of the pallet truck or other types of material handling equipment vehicles. In one version, a mezzanine printed circuit board (PCB) is adapted onto a pre-existing control unit for the material handling vehicle. In other variations, the functions of the separate mezzanine board can be integrated into the main control board.

With this system and technique, the hands of the operator are kept free to do the picking or placing without the need of using a glove, remote control, fob, and the like. The system is also designed to facilitate hands-free control and communication regardless of the network connectivity status in a facility. In other words, the hands-free control can operate independently of whether wireless or other types of communication systems are properly functioning which in turn improves safety.

The systems and techniques as described and illustrated herein concern a number of unique and inventive aspects. Some, but by no means all, of these unique aspects are summarized below.

Aspect 1 generally concerns a system.

Aspect 2 generally concerns the system of any previous aspect including a vehicle.

Aspect 3 generally concerns the system of any previous aspect in which the vehicle includes a powered pallet jack.

Aspect 4 generally concerns the system of any previous aspect in which the powered pallet jack is electrically powered.

Aspect 5 generally concerns the system of any previous aspect in which the vehicle includes a forklift truck.

Aspect 6 generally concerns the system of any previous aspect in which the vehicle is configured to move one or more items for material handling purposes.

Aspect 7 generally concerns the system of any previous aspect in which the vehicle includes a vehicle control system.

Aspect 8 generally concerns the system of any previous aspect in which the vehicle control system is configured to control the vehicle.

Aspect 9 generally concerns the system of any previous aspect in which the vehicle includes a remote receiver unit (RRU).

Aspect 10 generally concerns the system of any previous aspect in which the remote receiver unit is operatively coupled to the vehicle control system.

Aspect 11 generally concerns the system of any previous aspect in which the remote receiver unit is configured to send one or more vehicle control commands to the vehicle control system to control the vehicle.

Aspect 12 generally concerns the system of any previous aspect in which the remote receiver unit includes a controller area network (CAN) transceiver.

Aspect 13 generally concerns the system of any previous aspect in which the remote receiver unit includes a safety microcontroller unit (MCU).

Aspect 14 generally concerns the system of any previous aspect in which the safety MCU is operatively coupled to the CAN transceiver.

Aspect 15 generally concerns the system of any previous aspect in which the remote receiver unit includes a wireless personal area network (WPAN) transceiver.

Aspect 16 generally concerns the system of any previous aspect in which the WPAN transceiver includes a Bluetooth® low energy (BLE) type transceiver.

Aspect 17 generally concerns the system of any previous aspect in which the WPAN transceiver has a wireless personal area network (WPAN) antenna.

Aspect 18 generally concerns the system of any previous aspect in which the WPAN transceiver is operatively coupled to the safety MCU.

Aspect 19 generally concerns the system of any previous aspect in which the remote receiver unit includes a near-field communication (NFC) transceiver.

Aspect 20 generally concerns the system of any previous aspect in which the NFC transceiver has a near-field communication (NFC) antenna.

Aspect 21 generally concerns the system of any previous aspect in which the NFC transceiver is operatively coupled to the WPAN transceiver.

Aspect 22 generally concerns the system of any previous aspect including an operator control.

Aspect 23 generally concerns the system of any previous aspect in which the operator control is configured to facilitate hands-free control of the vehicle.

Aspect 24 generally concerns the system of any previous aspect in which the operator control is configured to control the vehicle via voice control.

Aspect 25 generally concerns the system of any previous aspect in which the operator control includes a remote terminal unit (RTU).

Aspect 26 generally concerns the system of any previous aspect in which the operator control includes a voice controller.

Aspect 27 generally concerns the system of any previous aspect in which the RTU includes the voice controller.

Aspect 28 generally concerns the system of any previous aspect in which the voice controller is configured to control the vehicle via voice control.

Aspect 29 generally concerns the system of any previous aspect in which the voice controller includes a microphone configured to receive one or more voice commands.

Aspect 30 generally concerns the system of any previous aspect in which the voice controller includes a remote terminal unit (RTU) module.

Aspect 31 generally concerns the system of any previous aspect in which the RTU module is operatively coupled to the microphone.

Aspect 32 generally concerns the system of any previous aspect in which the voice controller is configured to communicate with the remote receiver unit via a wireless connection.

Aspect 33 generally concerns the system of any previous aspect in which the RTU module is configured to communicate with the WPAN receiver via a wireless personal area network (WPAN).

Aspect 34 generally concerns the system of any previous aspect in which the voice controller includes a pairing button configured to pair the voice controller with the remote receiver unit via a wireless personal area network (WPAN) protocol.

Aspect 35 generally concerns the system of any previous aspect in which the pairing button is operatively coupled to the RTU module.

Aspect 36 generally concerns the system of any previous aspect in which the voice controller includes a stop button configured to stop the vehicle when actuated.

Aspect 37 generally concerns the system of any previous aspect in which the stop button is operatively coupled to the RTU module.

Aspect 38 generally concerns the system of any previous aspect in which the voice controller includes a headset jack operatively coupled to the RTU module.

Aspect 39 generally concerns the system of any previous aspect in which the voice controller includes a speaker operatively coupled to the RTU module.

Aspect 40 generally concerns the system of any previous aspect in which the voice controller is configured to convert the voice commands to vehicle control commands that are generated by a hand-operated remote control.

Aspect 41 generally concerns the system of any previous aspect in which the RTU module is configured to mimic the vehicle control commands that are generated by the hand-operated remote control.

Aspect 42 generally concerns the system of any previous aspect in which the voice controller is configured to transmit the vehicle control commands to the remote receiver unit to control the vehicle.

Aspect 43 generally concerns the system of any previous aspect in which the RTU module is configured to determine the vehicle control commands from the voice commands via a lookup table that associates the voice commands to the vehicle control commands.

Aspect 44 generally concerns the system of any previous aspect in which the RTU module is configured to determine the vehicle control commands from the voice commands via a machine learning technique.

Aspect 45 generally concerns the system of any previous aspect in which the RTU is configured to be worn.

Aspect 46 generally concerns the system of any previous aspect in which the voice controller is configured to be worn by an operator vocalizing the voice commands.

Aspect 47 generally concerns the system of any previous aspect in which the operator control is configured to control the vehicle via visual control.

Aspect 48 generally concerns the system of any previous aspect in which the vehicle is configured to follow movement of an operator via the operator control.

Aspect 49 generally concerns the system of any previous aspect in which the operator control includes a fiducial.

Aspect 50 generally concerns the system of any previous aspect in which the fiducial includes a barcode.

Aspect 51 generally concerns the system of any previous aspect in which the barcode is unique.

Aspect 52 generally concerns the system of any previous aspect in which the fiducial is configured to pair to the vehicle to prevent unintended operation of the vehicle.

Aspect 53 generally concerns the system of any previous aspect in which the fiducial includes an augmented reality University of Cordoba (ArUco) marker.

Aspect 54 generally concerns the system of any previous aspect in which the fiducial is located on clothing worn by an operator.

Aspect 55 generally concerns the system of any previous aspect in which the fiducial is incorporated into personal protective equipment (PPE).

Aspect 56 generally concerns the system of any previous aspect in which the fiducial is attached to a safety vest.

Aspect 57 generally concerns the system of any previous aspect including a visual tracker interface.

Aspect 58 generally concerns the system of any previous aspect in which the visual tracker interface is operatively coupled to the remote receiver unit.

Aspect 59 generally concerns the system of any previous aspect in which the visual tracker interface includes one or more cameras.

Aspect 60 generally concerns the system of any previous aspect in which the cameras are configured to capture one or more images of the fiducial.

Aspect 61 generally concerns the system of any previous aspect in which the visual tracker interface includes a visual tracker controller.

Aspect 62 generally concerns the system of any previous aspect in which the cameras are operatively coupled to the visual tracker controller.

Aspect 63 generally concerns the system of any previous aspect in which the visual tracker controller is configured to convert the images of the fiducial to one or more vehicle control commands.

Aspect 64 generally concerns the system of any previous aspect including a controller area network (CAN) operatively coupling the visual tracker controller to the remote receiver unit.

Aspect 65 generally concerns the system of any previous aspect in which the CAN transceiver is operatively coupled to the CAN.

Aspect 66 generally concerns the system of any previous aspect in which the visual tracker controller is configured to send the vehicle control commands to the remote receiver unit.

Aspect 67 generally concerns the system of any previous aspect in which the cameras are configured to view an advance zone.

Aspect 68 generally concerns the system of any previous aspect in which the visual tracker controller is configured to only track motion of the fiducial when in the advance zone.

Aspect 69 generally concerns the system of any previous aspect in which the visual tracker controller is configured to move the vehicle in the same direction as the fiducial.

Aspect 70 generally concerns the system of any previous aspect in which the visual tracker controller is configured to move the vehicle at the same speed as the fiducial.

Aspect 71 generally concerns the system of any previous aspect in which the visual tracker controller is configured to turn the vehicle in the same direction as the fiducial.

Aspect 72 generally concerns the system of any previous aspect in which the visual tracker interface includes one or more light sources.

Aspect 73 generally concerns the system of any previous aspect in which the light sources are operatively coupled to the visual tracker controller.

Aspect 74 generally concerns the system of any previous aspect in which the light sources include one or more laser beam generators.

Aspect 75 generally concerns the system of any previous aspect in which the light sources are configured to shine light indicative of the advance zone.

Aspect 76 generally concerns the system of any previous aspect in which the visual tracker interface includes a mezzanine printed circuit board (PCB).

Aspect 77 generally concerns the system of any previous aspect in which the mezzanine PCB is operatively coupled to the remote receiver unit.

Aspect 78 generally concerns the system of any previous aspect in which the mezzanine board is retrofitted into the vehicle.

Aspect 79 generally concerns the system of any previous aspect in which the visual tracker controller is configured to determine motion of the fiducial through machine learning.

Aspect 80 generally concerns the system of any previous aspect in which the remote receiver unit is configured to only accept commands when the vehicle is in an automatic mode.

Aspect 81 generally concerns the system of any previous aspect in which the remote receiver unit is configured to not execute commands when the vehicle is in a manual mode.

Aspect 83 generally concerns the system of any previous aspect in which the cameras are located on opposite sides of the vehicle.

Aspect 84 generally concerns the system of any previous aspect in which the light sources are located on opposite sides of the vehicle.

Aspect 85 generally concerns the system of any previous aspect in which the visual tracker interface is configured to convert the images to vehicle control commands that are generated by a hand-operated remote control.

Aspect 86 generally concerns the system of any previous aspect in which the visual tracker controller is configured to mimic the vehicle control commands that are generated by the hand-operated remote control.

Aspect 87 generally concerns the system of any previous aspect in which the vehicle control commands include a stop command.

Aspect 88 generally concerns the system of any previous aspect in which the vehicle control commands include a move command.

Aspect 89 generally concerns the system of any previous aspect in which the vehicle control commands include a turn command.

Aspect 90 generally concerns the system of any previous aspect in which the vehicle control commands include a velocity command.

Aspect 91 generally concerns the system of any previous aspect in which the vehicle control commands include a direction command.

Aspect 92 generally concerns the system of any previous aspect in which the operator control is configured for retrofitting into preexisting vehicle control systems.

Aspect 93 generally concerns the system of any previous aspect in which the vehicle is configured to be controlled via both voice control and visual control.

Aspect 94 generally concerns a method.

Aspect 95 generally concerns the method of any previous aspect including receiving a hands-free command from an operator of a vehicle during a material handling activity with the vehicle.

Aspect 96 generally concerns the method of any previous aspect including changing motion of the vehicle in response to the hands-free command.

Aspect 97 generally concerns the method of any previous aspect including receiving the hands-free command includes listening to a voice command from the operator with a voice controller.

Aspect 98 generally concerns the method of any previous aspect including converting the voice command to one or more vehicle control commands with the voice controller.

Aspect 99 generally concerns the method of any previous aspect in which the vehicle control commands mimic those issued by a hand-operated remote control.

Aspect 100 generally concerns the method of any previous aspect including transmitting the vehicle control commands from the voice controller to a remote receiver unit (RRU) of the vehicle.

Aspect 101 generally concerns the method of any previous aspect including recognizing with the remote receiver unit only the vehicle control commands.

Aspect 102 generally concerns the method of any previous aspect including receiving the hands-free command includes viewing a state of a fiducial on the operator with a camera.

Aspect 103 generally concerns the method of any previous aspect in which the state of the fiducial includes visibility of the fiducial with the camera.

Aspect 104 generally concerns the method of any previous aspect including stopping the vehicle when the fiducial is not visible to the camera.

Aspect 105 generally concerns the method of any previous aspect in which the state of the fiducial includes movement of the fiducial.

Aspect 106 generally concerns the method of any previous aspect including moving the vehicle when the fiducial moves.

Aspect 107 generally concerns the method of any previous aspect including matching velocity of the vehicle with velocity of the fiducial.

Aspect 108 generally concerns the method of any previous aspect in which the state of the fiducial includes presence of the fiducial within an advance zone.

Aspect 109 generally concerns the method of any previous aspect including moving the vehicle when the camera views the fiducial in the advance zone.

Aspect 110 generally concerns the method of any previous aspect including stopping the vehicle when the camera does not view the fiducial in the advance zone.

Aspect 111 generally concerns the method of any previous aspect including shining light with a light source to create a shape that is indicative of the advance zone.

Aspect 112 generally concerns the method of any previous aspect including capturing one or more images of the fiducial with the camera.

Aspect 113 generally concerns the method of any previous aspect including converting the images to one or more vehicle control commands with a visual tracker controller.

Aspect 114 generally concerns the method of any previous aspect including transmitting the vehicle control commands from the visual tracker controller to a remote receiver unit (RRU) of the vehicle.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
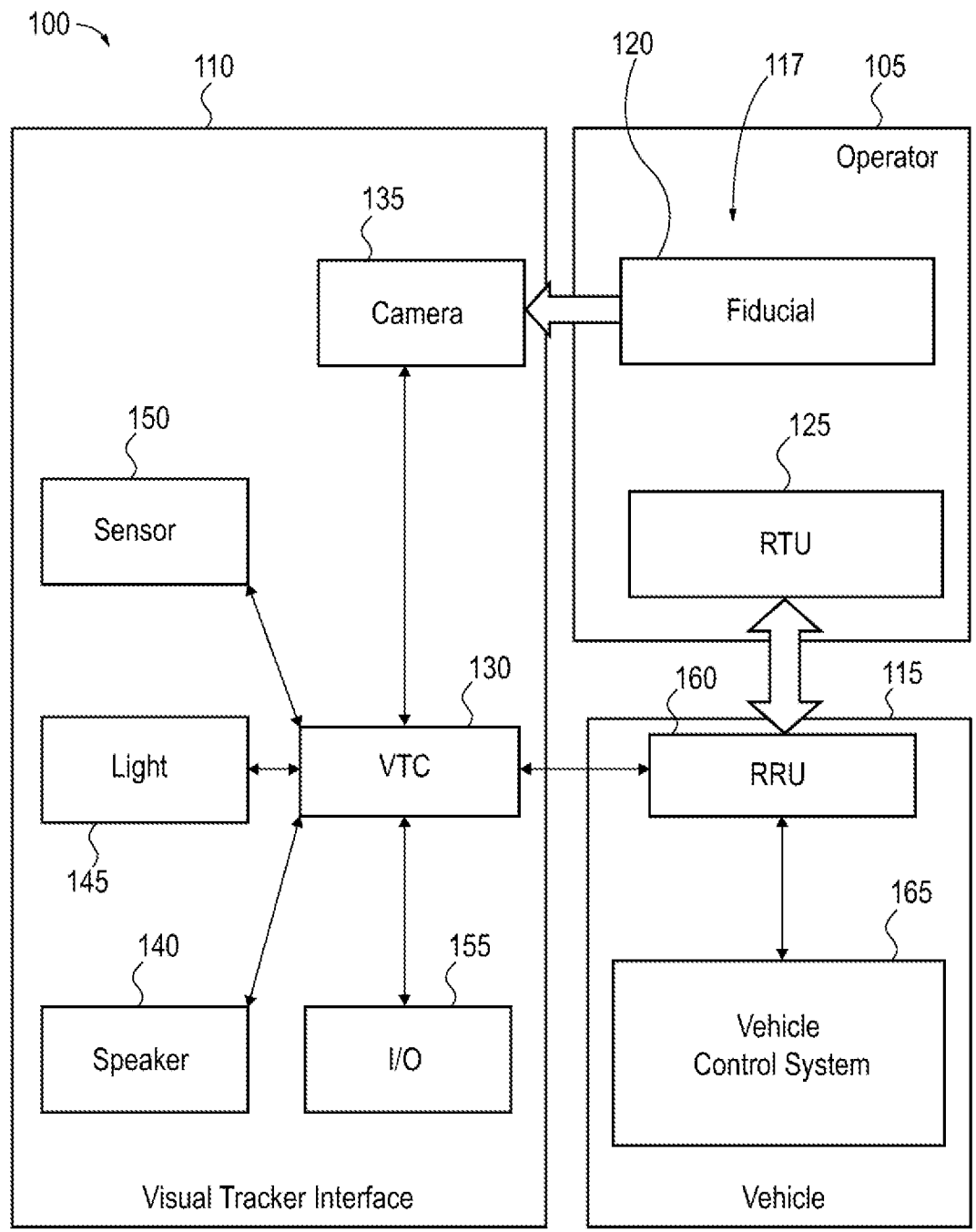
FIG. 1 is a block diagram of a system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A material handling system 100 according to one example is illustrated in FIG. 1. The system 100 includes an operator 105, a visual tracker interface 110, and a material handling vehicle 115. The operator 105 has one or more operator controls 117 that facilitate hands-free control of the vehicle 115. In the illustrated example, the operator controls 117 include a fiducial 120 and a voice-control remote terminal unit (RTU) 125. The operator control 117 is typically worn by or in the possession of the operator 105. In one version, the operator 105 wears the fiducial 120, such as on a vest or other garment, and likewise, the operator 105 wears the RTU 125. By wearing the fiducial 120 and the RTU 125 the hands of the operator 105 are free to pick, place, or otherwise handle items.

As can be seen, the visual tracker interface 110 includes a visual tracker controller (VTC) 130, a camera 135, a sensor 150, a speaker 140, a light source 145, a sensor 150, and an input/output device (I/O device) 155. In the illustrated example, the visual tracker controller 130 is operatively coupled to the camera 135, the speaker 140, the light source 145, the sensor 150, and the I/O device 155. The visual tracker controller 130 is configured to control the operation of the vehicle 115. Moreover, the visual tracker controller 130 is configured to communicate with the vehicle 115. As should be recognized, the visual tracker controller 130 includes a processor, memory, and other electronic components for carrying out various operations. Among other things, the camera 135 is configured to image the fiducial 120. As will be explained below, the camera 135 tracks the fiducial 120 in order to control the operation of the vehicle 115.

The speaker 140 provides audible feedback to the operator to indicate various status or operational information concerning the system 100. For example, the speaker 140 can create an audible sound to indicate that the vehicle 115 is in an autonomous or semi-autonomous operational mode. The light source 145 is used to help guide the operator during autonomous or semi-autonomous use. The light source 145, in one example, includes one or more lasers that shine laser beams on the floor to indicate the work or advance area for the operator 105. The sensor 150 is configured to sense various conditions within the system 100. For example, the sensor 150 can include proximity or other types of sensors for sensing the operator 105. The I/O device 155 can provide feedback to the operator 105 as well as allow the operator 105 to interact with the system 100. The I/O device 155 in one example includes one or more light emitting diodes (LEDs) that light to indicate the status of the system 100. It should be appreciated that the various components of the visual tracker interface 110 can be operatively coupled together in other manners than is illustrated. Moreover, one or more of these components can be integrated together to form a single unit. In other forms, some of the components may be absent or incorporated into other systems.

The visual tracker interface 110 is configured to be readily integrated into pre-existing material handling systems or vehicles. As noted before, some automated pallet jacks have the operator utilize a glove, a hand operated remote control, or fob in order to control the pallet jack. In other words, a handheld remote control is used to control the electric pallet jack. By having the remote control held in the hand of the operator, it was found that the remote control complicated and slowed down the material handling process. For example, the pallet jack operator needs to hold the remote control in their hand in order to push a button to move the pallet jack. Likewise, the glove or other remote control can interfere with the material handling process when the operator grabs a carton or another item. The vehicle 115 for explanation purposes will be described as being an electric pallet jack, such as those sold by Raymond Corporation, but it should be appreciated that the system 100 can be utilized on other types of material handling equipment or vehicles, such as forklift trucks and automated guided vehicles (AGVs).

The visual tracker interface 110 is configured to mimic the commands and operation of traditional remote controls for automated material handling vehicles. This case in retrofitting to existing systems not only facilitates quick adoption of hands-free operation, but this design has been further configured with safety in mind.

As can be seen, the vehicle 115 includes a remote radio unit (RRU) 160 that is able to communicate with the RTU 125 and the visual tracker controller 130, such as via a wired and/or wireless connection. The remote radio unit 160 is in turn operatively coupled to a vehicle control system 165 of the vehicle 115. In one example, the RTU 125 communicates with the remote radio unit 160 in the vehicle 115 via a short-range communication protocol, such as via the Bluetooth® protocol. The RTU 125 is paired with the remote radio unit 160, and once paired, the RTU 125 is able to issue commands to the vehicle 115 via the remote radio unit 160. In one version, the visual tracker controller 130 communicates with the remote radio unit 160 of the vehicle 115 via a wired connection. The commands, data, or other information transmitted by the RTU 125 and the visual tracker controller 130 is relayed by the remote radio unit 160 to the rest of the vehicle control system 165.

Figure 2:
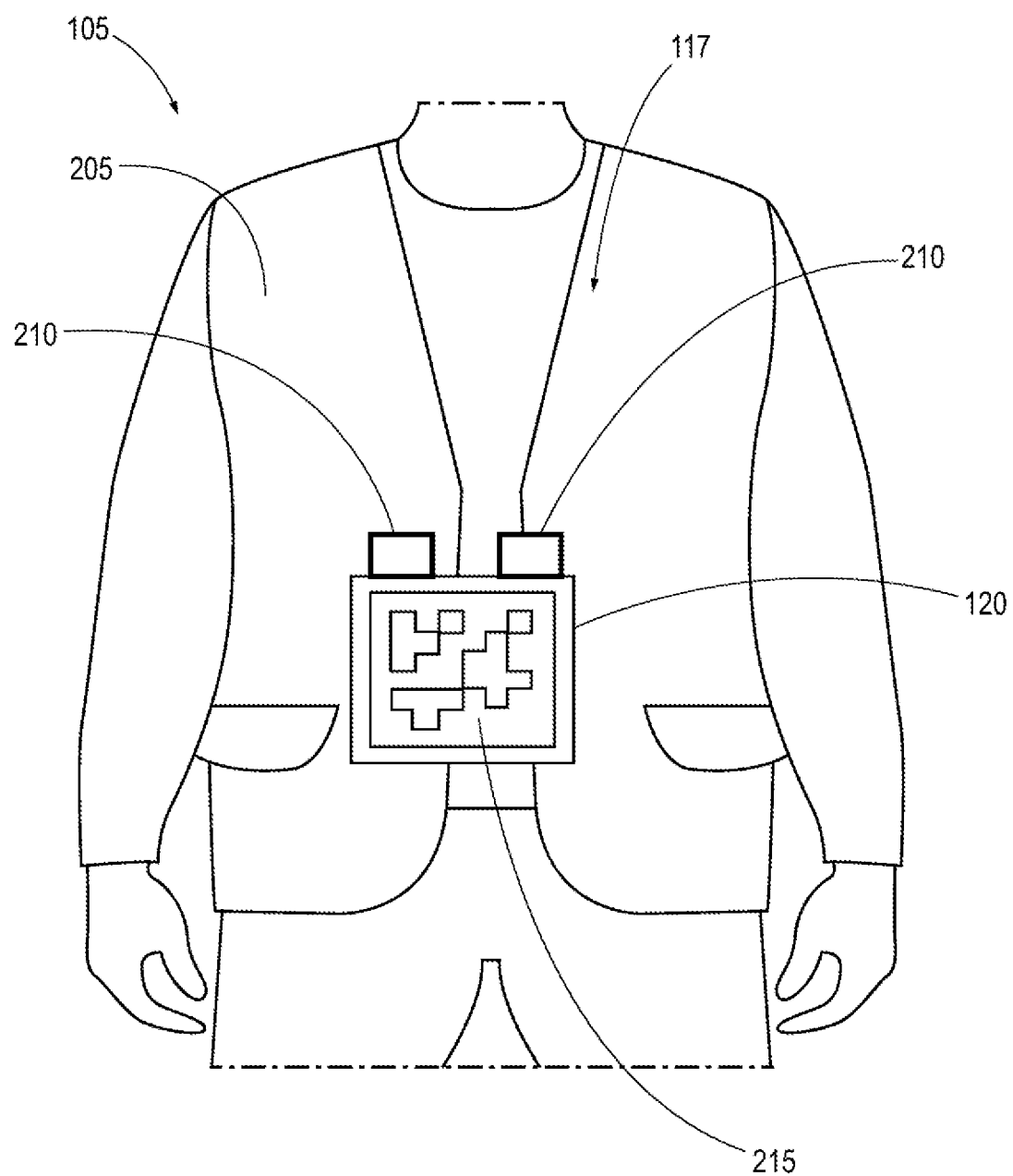
FIG. 2 is a front view of an operator wearing a safety vest with a fiducial for the system of FIG. 1.

FIG. 2 shows one example of how the fiducial 120 can be worn by the operator 105. In this example, the operator 105 wears a safety vest 205. The fiducial 120 is secured to the safety vest 205 via one or more fasteners 210. the fiducial 120 includes at least one barcode 215 that is read and tracked by the camera 135 of the visual tracker interface 110 to facilitate remote semi-autonomous control of the vehicle 115. In one example the fasteners 210 include loop and hook type fasteners, but it should be appreciated that the fasteners 210 in other examples can include other types of fasteners or ways of securing the fiducial 120 to the operator 105. Moreover, it should be recognized that in other variations the safety vest 205 is not needed or another piece of clothing is used to secure the fiducial 120 to the operator 105. For instance, the fiducial 120 can be integrally formed into a jacket, shirt, safety helmet, or other type of clothing article. The fiducial 120 is positioned on at least one side of the operator 105. In the illustrated example, the fiducial 120 is secure to the front facing side of the operator 105. With the fiducial 120, the visual tracker interface 110 via the camera 135 is able to track the operator 105 and move the vehicle 115 with the operator 105 as the operator 105 performs various material handling tasks.

Figure 3:
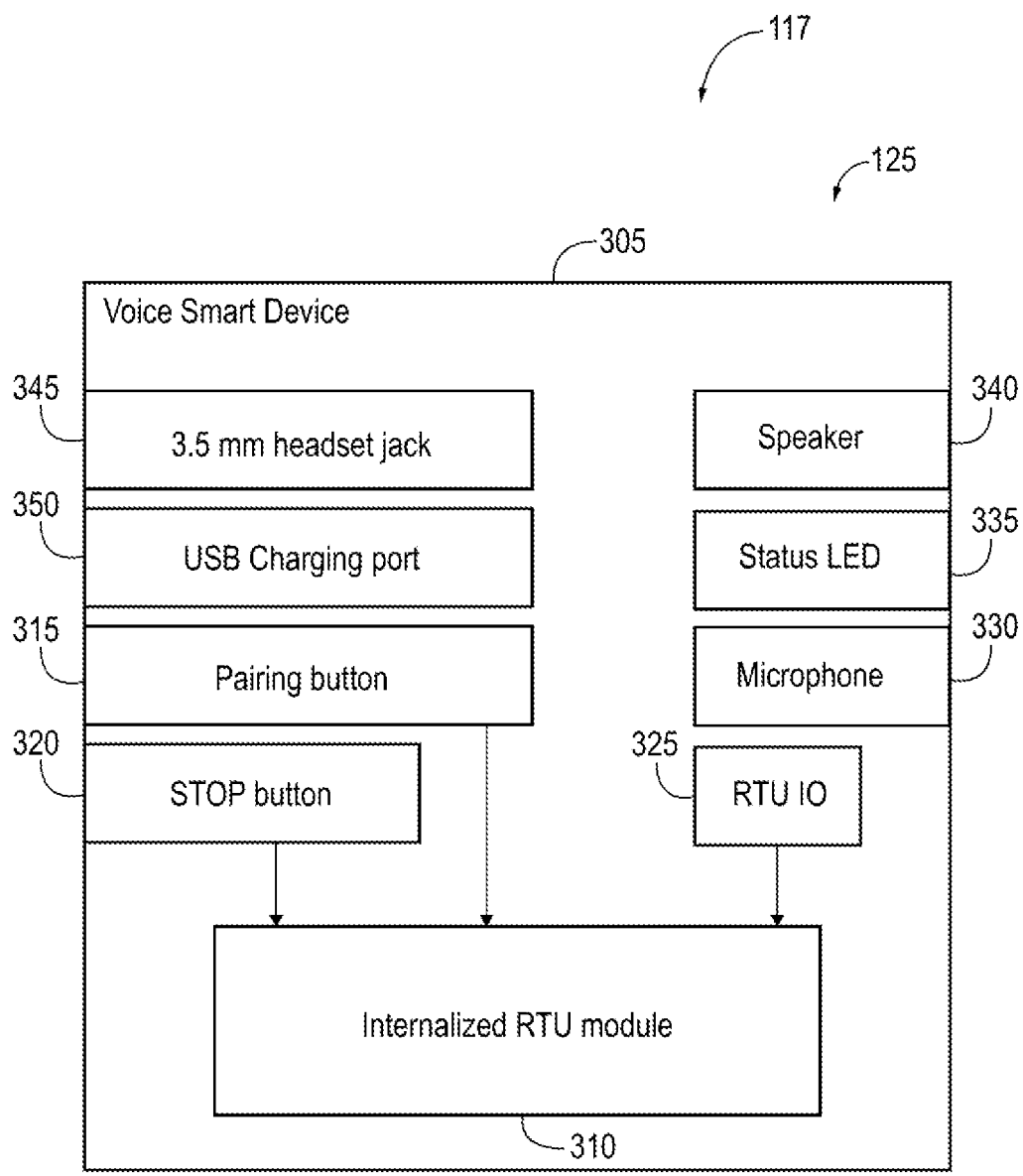
FIG. 3 is a block diagram of a voice controller that can be used in the system of FIG. 1.

FIG. 3 shows a block diagram of one example of the voice-control RTU 125. In this example, the RTU 125 includes a voice controller 305. Through the voice controller 305, the operator 105 is able to control the operation of the vehicle 115. As can be seen, the voice controller 305 includes an RTU module 310, a pairing button 315, a stop or control button 320, and an RTU I/O device 325. In one form, the RTU module 310 includes a processor, memory, and other electronic components commonly found in various types of controllers. The RTU module 310 is configured to process various voice commands and interpret them so that the command can then be transmitted to the remote radio unit 160 of the vehicle 115. The pairing button 315 is used to facilitate pairing between the voice controller 305 and the remote radio unit 160 of the vehicle 115. This pairing reduces the chance of inadvertent operation of the vehicle 115. In one example, the Bluetooth® pairing protocol is used to pair the voice controller 305 with the remote radio unit 160 of the vehicle 115. The control button 320 is used to stop the vehicle 115 from moving. When the control button 320 is pressed, the RTU module 310 issues a command to the remote radio unit 160 of the vehicle 115 to stop the vehicle 115 from moving.

The RTU I/O device 325 is used to interface with the RTU module 310 of the voice controller 305. In the illustrated example, the RTU I/O device 325 includes at least one microphone 330, at least one light emitting diode (LED) 335, and at least one speaker 340. Through the microphone 330, the voice controller 305 is able to receive wake words and/or voice commands from the operator 105. In most cases, a wake word needs to be spoken with the voice command, but in some cases, such as for safety purposes, only the voice command is required. The RTU module 310 processes the voice commands and transmits the appropriate command to the remote radio unit 160 of the vehicle 115. The voice commands are processed locally on the voice controller 305. In one example, the RTU module 310 is in the form of a Nicola's voice processor board that utilizes artificial intelligence (AI) to process the voice commands. In one form, the RTU module 310 utilizes a neural network to process the commands. For example, the RTU module 310 via the microphone 330 receives a voice command to stop the vehicle 115. The RTU module 310 translates the vocal sound or voice command to the appropriate operational command to transmit to the remote radio unit 160 of the vehicle 115. The LED 335 and speaker 340 can be used to provide audible as well as visual feedback to the operator 105 to indicate whether or not the wake word and/or the command was properly received and/or interpreted. In one form, the RTU I/O device 325 further includes a headset jack 345 through which the operator 105 is able to provide voice commands and/or receive audible feedback from the voice controller 305. In one version, the voice controller 305 is powered by one or more disposable batteries. In the illustrated example, the voice controller 305 includes one or more rechargeable batteries that are charged via a charging port 350, such as a USB charging port. The charging port 350 in further variations can be also used to program or otherwise interface with the RTU module 310.

Figure 4:
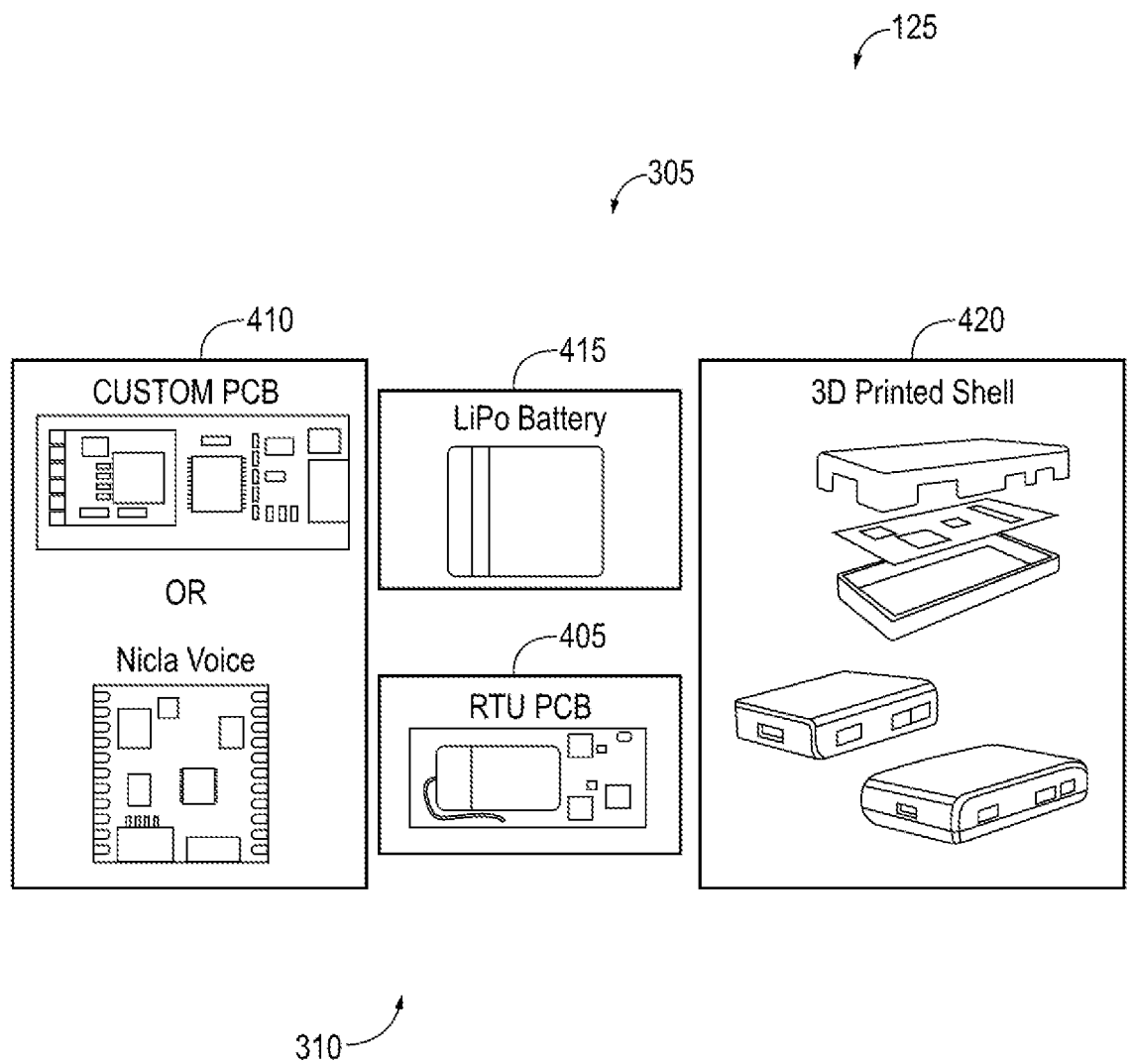
FIG. 4 is another block diagram of the voice controller of FIG. 3.

FIG. 4 shows a block diagram of one example of the various components that can be used to form the voice controller 305 in FIG. 3. In this example, the RTU module 310 includes a remote terminal unit printed circuit board (RTU board) 405 and a voice control board 410. In one variation, the RTU board 405 is a custom printed circuit board (PCB), and in another variation, the voice control board 410 is a Nicola voice card or PCB. In the illustrated example, the voice controller 305 includes a battery 415 in the form of a rechargeable lithium-ion battery. The voice controller 305 can be powered in other ways, in other variations. The voice controller 305 further includes a housing 420 that houses the various components of the voice controller 305.

Figure 5:
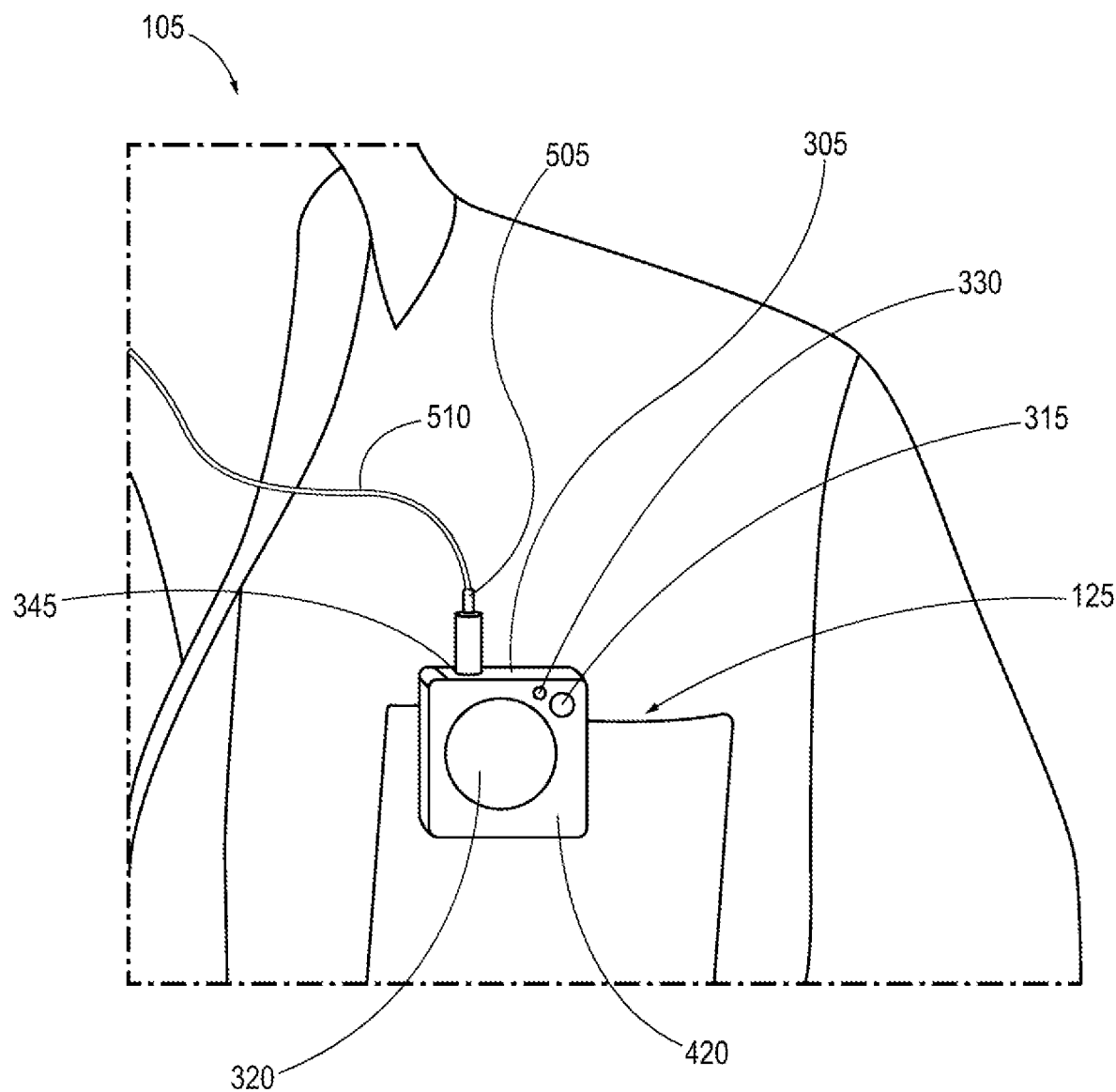
FIG. 5 is a front view of the operator wearing the voice controller of FIG. 3.

FIG. 5 shows one example of the voice controller 305 being worn by the operator 105. In the illustrated example, the voice controller 305 includes a clip that is configured to clip to a shirt pocket or other area of clothing, and in other examples, the voice controller 305 can be secured in other ways, such as via one or more fasteners. As can be seen, the voice controller 305 in this example includes the pairing button 315, the control button 320, the microphone 330, and the headset jack 345 of the type described above. In this example, a headset plug 505 is plugged into the headset jack 345. The headset plug 505 has a headset cable 510 that is coupled to a headset worn by the operator 105. The headset in one example include one or more headphones and a microphone, but the headset can be configured differently in other examples. Through the headset, the operator 105 is able to issue voice commands to the voice controller 305 of the RTU 125.

Figure 6:
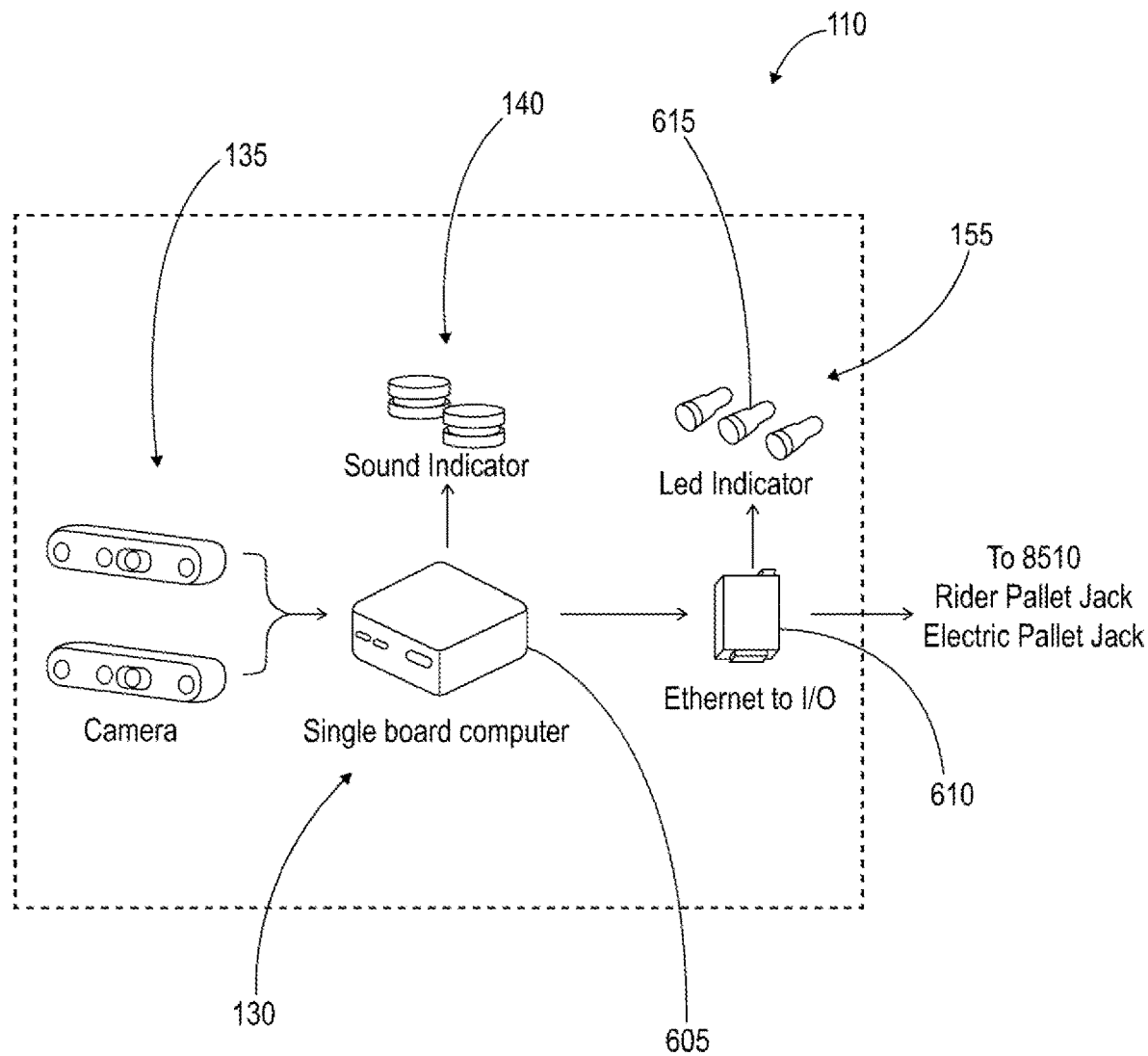
FIG. 6 is a block diagram of one example of a visual tracker interface in the system of FIG. 1.

FIG. 6 shows a block diagram of one example or version for implementing the visual tracker interface 110 of FIG. 1. In this example, the visual tracker interface 110 includes one or more cameras 135. The visual tracker controller 130 is in the form of a computer 605. Like before, the visual tracker interface 110 includes the speaker 140. The I/O device 155 in this example includes a network interface card 610, such as an Ethernet card, and one or more LEDs 615. Via the network interface card 610, the computer 605 is able to communicate with the remote radio unit 160 of the vehicle 115. In this example, the computer 605 via the cameras 135 is able to track the fiducial 120 on the operator 105. When movement of the fiducial 120 is detected via the cameras 135, the computer 605 sends a command via the network interface card 610 to the remote radio unit 160 of the vehicle 115. On the other hand, when the operator 105 stops, the computer 605 sends a command to the remote radio unit 160 of the vehicle 115 to stop movement of the vehicle 115.

Figure 7:
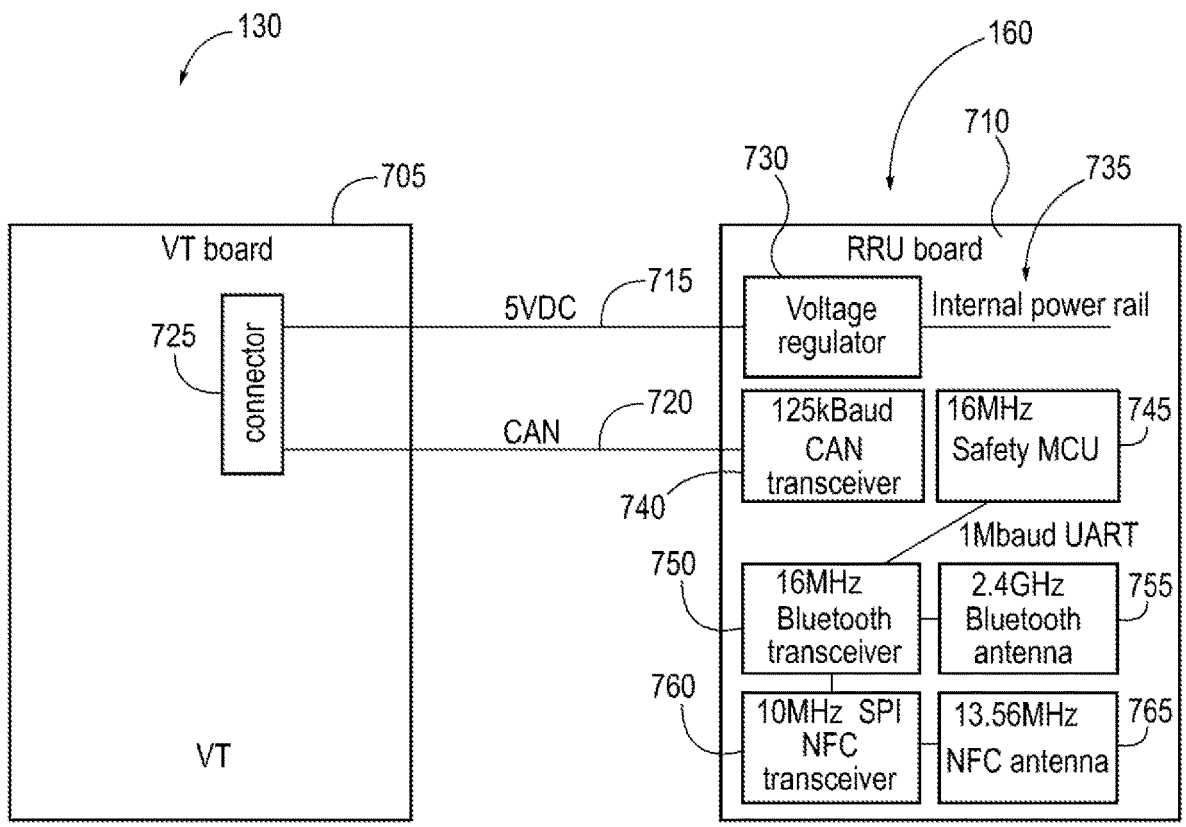
FIG. 7 is a block diagram of a visual tracker controller and a remote radio unit used in the system of FIG. 1.

FIG. 7 shows a block diagram of one example of the visual tracker controller 130 and the remote radio unit 160. In this illustrated example, the visual tracker controller 130 includes a visual tracker board (VT board) 705. The remote radio unit 160 includes a remote radio unit board (RRU board) 710 that is operatively connected to the VT board 705. The VT board 705 acts as a mezzanine type board to readily upgrade the capabilities of the vehicle 115. As can be seen, electrical power between the VT board 705 and the RRU board 710 is transferred via a power cable 715, and the VT board 705 and the RRU board 710 communicate via a controller area network bus (CAN bus) 720. In one example, the VT board 705 is in the form of a printed circuit board (PCB). Likewise, in one version, the RRU board 710 is in the form of a printed circuit board (PCB). The VT board 705 and the RRU board 710 are depicted as being separate in the illustrated example, but in other variations, the VT board 705 and RRU board 710 can be integrated together to form a single unit. In this illustrated example, by being separate, the VT board 705 can be retrofitted into a pre-existing system 100 by being operatively connected to the RRU board 710. As shown, the VT board 705 includes a connector 725 that operatively connects to the power cable 715 and the CAN bus 720.

The RRU board 710 includes a voltage regulator 730 that is configured to supply electrical power via the power cable 715 to the connector 725 of the VT board 705 in order to power the VT board 705. The voltage regulator 730 regulates the voltage applied along the power cable 715. As can be seen, the voltage regulator 730 receives electrical power from a power rail 735 of the vehicle 115 that is electrically connected to the voltage regulator 730.

The RRU board 710 further includes a controller area network transceiver (CAN transceiver) 740 that is operatively coupled to the CAN bus 720 in order to communicate with the VT board 705. In the depicted example, the CAN transceiver 740 is operatively connected to a safety controller 745. In one form, the safety controller 745 includes a microcontroller unit (MCU), but in other examples, the safety controller 745 can come in other forms. The CAN transceiver 740 allows the RRU board 710 to communicate along the CAN bus 720. In the depicted example, the RRU board 710 is further configured to communicate wirelessly. For instance, as shown, the RRU board 710 includes a wireless personal area network transceiver (WPAN) 750 that is operatively coupled to the safety controller 745. The WPAN transceiver 750 has a wireless personal area network antenna (WPAN antenna) 755 to receive wireless or radio signals (e.g., via Bluetooth®), such as from the RTU 125. The RRU board 710 in the illustrated example further includes a near-field communication transceiver (NFC transceiver) 760 that has a near-field communication antenna (NFC antenna) 765 for communicating with near-field communication devices, like radio frequency identification (RFID) tags.

Figure 8:
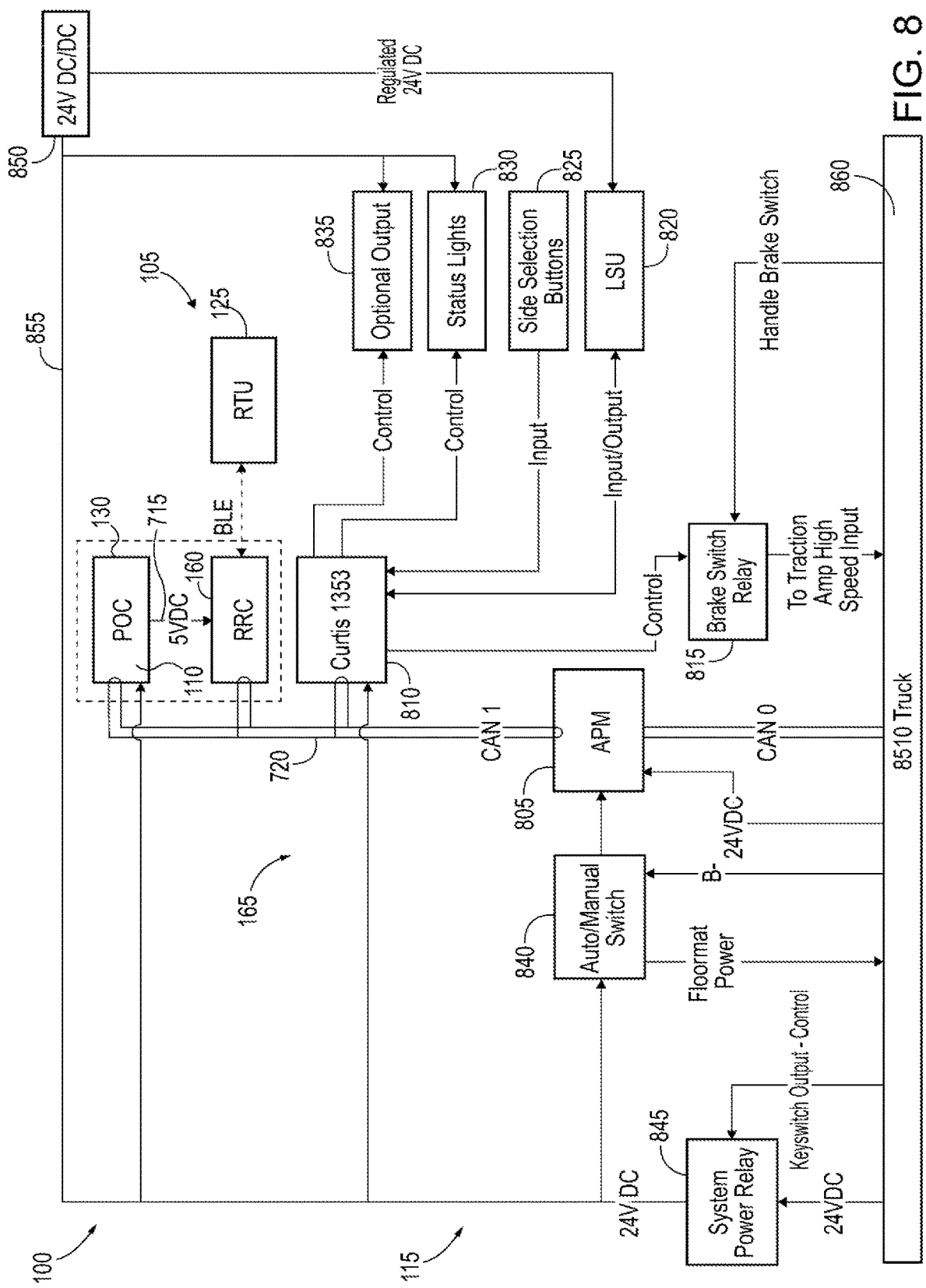
FIG. 8 is a schematic of one version of the system of FIG. 1.

FIG. 8 shows a schematic of one implementation of the system 100 of FIG. 1. As illustrated, the system 100 includes the RTU 125 that is operated by the operator 105. The system 100 further includes the visual tracker interface 110 with the visual tracker controller 130 and the remote radio unit 160 of the type described before. As noted above with respect to FIG. 7, the visual tracker controller 130 and the remote radio unit 160 in this example are operatively coupled together via the power cable 715 and the CAN bus 720.

The system 100 in FIG. 8 will be described with respect to an electric pallet truck, but it should be recognized that the system 100 can be used with other types of vehicles 115. In this example, the vehicle 115 includes an auxiliary processing module (APM) 805 that is operatively connected to the visual tracker interface 110 and the remote radio unit 160 via the CAN bus 720. The APM 805 controls the operation of various components located either inside or outside of the vehicle 115.

In order to facilitate communication with other components, the vehicle 115 in this example includes a controller area network expansion module (CAN module) 810 that is operatively connected to the CAN bus 720. As depicted, the CAN expansion module 810 is operatively coupled to a number of input or output devices. For instance, the CAN expansion module 810 is operatively coupled to a brake switch relay 815, a linear system unit (LSU) 820, a selection button 825, a status indicator 830, and a spare output 835. In the illustrated example, the visual tracker controller 130 of the visual tracker interface 110 is operatively connected to the remote radio unit 160 via the CAN bus 720, but in other examples, the visual tracker interface 110 can be operatively coupled to the remote radio unit 160 via the CAN expansion module 810 or in other ways. In one form, the brake switch relay 815 is able to stop the vehicle 115 by applying the brakes of the vehicle 115. The selection button 825 is actuated by the operator 105 to control various functions of the vehicle 115. The status indicator 830 is configured to indicate the status of the vehicle 115 and other related equipment. The spare output 835 provides an optional output for the vehicle 115.

The vehicle 115 in the illustrated example further includes an auto/manual switch 840 and a power relay 845. The auto/manual switch 840 is configured to allow the vehicle 115 to switch between the automatic and manual operation modes. During the automatic mode, the vehicle 115 is able to move autonomously or semi-autonomously without the aid of the operator 105. When in the manual mode, the vehicle 115 is manually moved via the operator 105. During the autonomous mode, the vehicle 115 is able to accept voice commands or other remote commands from the RTU 125. Moreover, the vehicle 115 is able to autonomously or semi-autonomously move along with the operator 105 by tracking the movement of the fiducial 120. In order to supply and control the electrical power within the system 100, the vehicle 115 includes the power relay 845 and a power supply 850. The electrical power is supplied in the system 100 via a power bus 855. As can be seen, the power relay 845 and the power supply 850 via the power bus 855 supply electrical power to the visual tracker controller 130, the remote radio unit 160, the APM 805, the CAN expansion module 810, the LSU 820, the selection button 825, the status indicator 830, the spare output 835, and the auto/manual switch 840. As shown, the APM 805, the brake switch relay 815, the auto/manual switch 840, and the power relay 845 are operatively connected to the other vehicle systems 860 of the vehicle 115.

Figure 9:
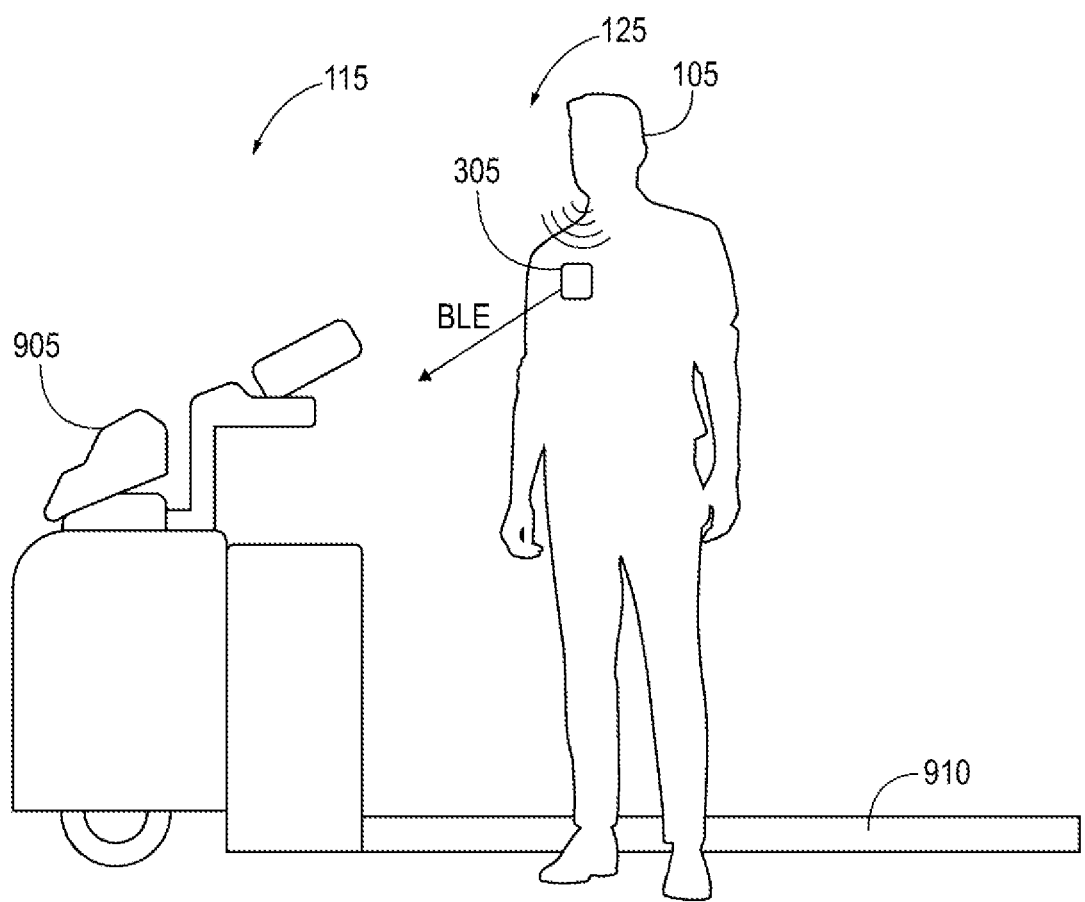
FIG. 9 is a side view of a powered pallet jack according to one example that can be used in the system of FIG. 1.

FIG. 9 shows one example of a working environment utilizing voice commands through the RTU 125. As shown, the operator 105 in this example is wearing the voice controller 305. In this example, the vehicle 115 includes a powered pallet jack 905. The powered pallet jack 905 includes one or more forks 910 that are used to carry pallets and/or other objects. The operator 105 issues a verbal command via the voice controller 305. The voice controller 305 converts the verbal command to a vehicle control command that is understandable by the powered pallet jack 905. The powered pallet jack 905 includes the remote radio unit 160 and the vehicle control system 165 of the type described above. In this example, the powered pallet jack 905 was originally designed to operate using a handheld or glove remote control-based system in which the operator 105 presses buttons on the remote control, fob, or glove so as to move or stop the powered pallet jack 905. Once more, requiring such hand operation impedes the material handling process by the operator 105. Issuing verbal commands instead is a lot quicker and easier for the operator 105 to perform. In one version, the powered pallet jack 905 does not include the visual tracker interface 110 so as to facilitate easy retrofitting to the powered pallet jack 905. The voice controller 305 generally supplants or replaces the handheld remote control. In essence, the voice controller 305 copies or mimics the standard commands from the handheld remote for controlling the powered pallet jack 905. This in turn helps in quickly retrofitting or upgrading the powered pallet jack 905 to allow for verbal, hands-free control. In one example, all of the verbal or voice processing occurs on the voice controller 305, and the voice controller 305 sends the start, stop, turn, and/or other commands to the powered pallet jack 905. In another variation, the powered pallet jack 905 additionally includes the visual tracker interface 110 and associated parts that are retrofitted into the powered pallet jack 905 so as to facilitate further capability of visual tracking via the fiducial 120.

Figure 10:
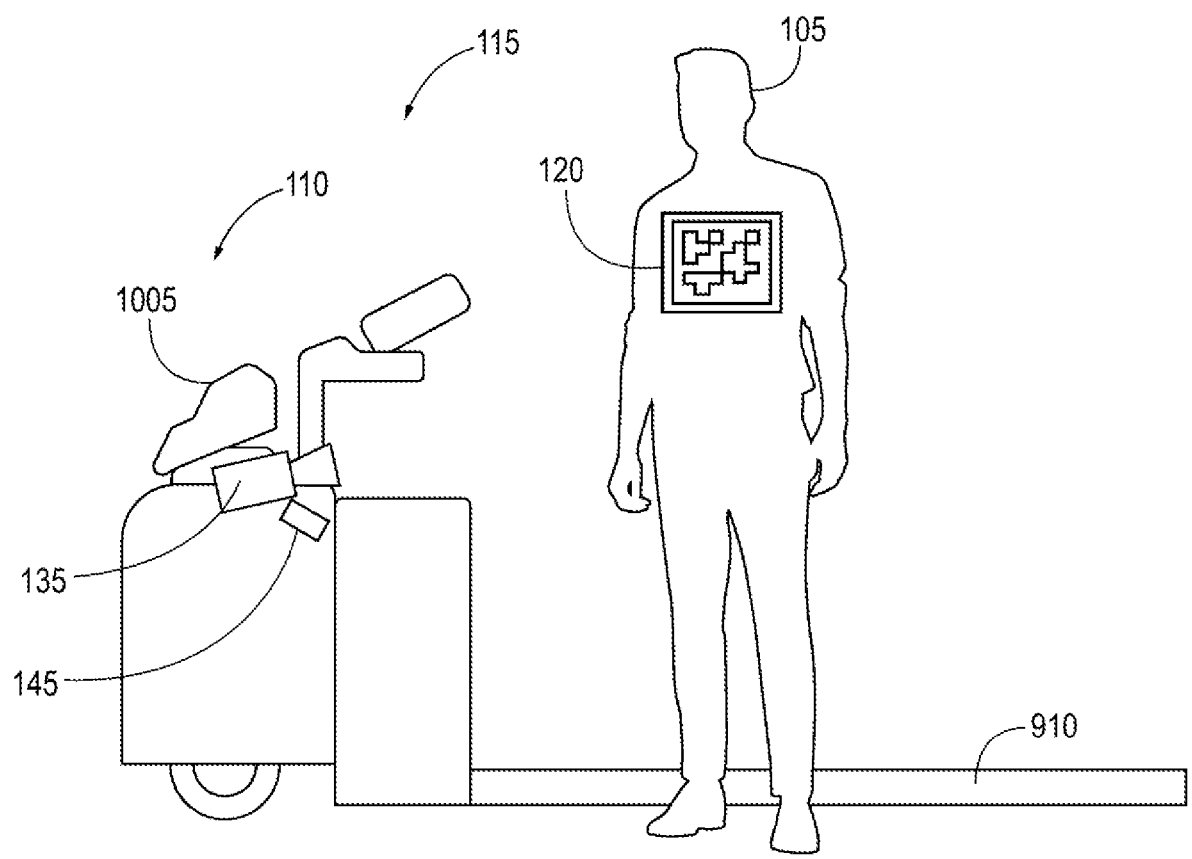
FIG. 10 is a side view of a powered pallet jack according to another example that can be used in the system of FIG. 1.

FIG. 10 illustrates another use case example in which this case the operator 105 wears the fiducial 120. In this example, the vehicle 115 includes a powered pallet jack 1005 with one or more forks 910. In this case, the powered pallet jack 1005 has been retrofitted with the visual tracker interface 110, and the cameras 135 and the light sources 145 are mounted on the powered pallet jack 1005. Once more, the camera 135 tracks the movement and location of the fiducial 120 on the operator 105. The light source 145 shows the advance area or provides other indicators to the operator concerning the visual movement tracking process. As will be explained below, the system 100 in other examples incorporates both fiducial and voice control capabilities in the powered pallet jack 1005.

Figure 11:
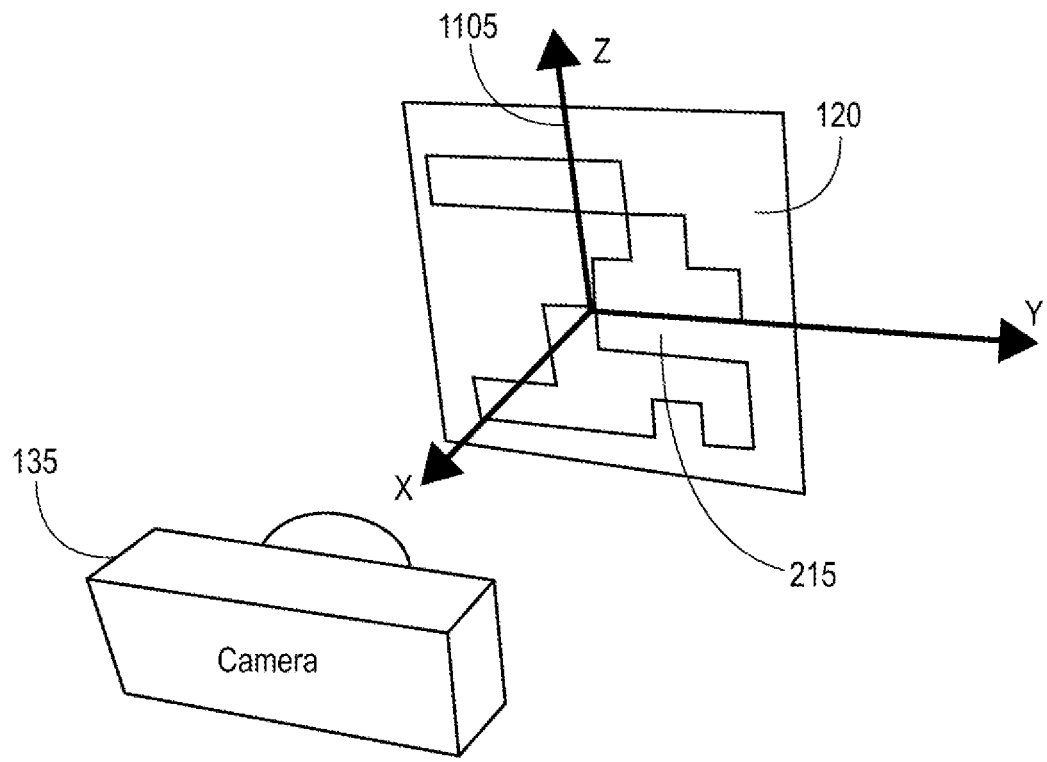
FIG. 11 is a perspective view of the fiducial being read by a camera in the system of FIG. 1.

Turning to FIG. 11, to properly track the relative location of the fiducial 120 worn by the operator 105, the camera 135 of the visual tracker interface 110 needs to recognize the barcode 215 on the fiducial 120. In the illustrated example, the barcode 215 is an ArUco fiducial marker. One issue is that the fiducial 120 tends to flap or otherwise move as the operator 105 moves. In other words, the fiducial 120 does not face flat relative to the camera 135. To address this issue, the visual tracker interface 110 in one example utilizes artificial intelligence (AI) or machine-learning techniques in order to locate and recognize the barcode 215 on the fiducial 120 even when the fiducial 120 is not perpendicular or transverse to the view of the camera 135. As indicated by a coordinate axis 1105 in FIG. 11, the visual tracker controller 130 of the visual tracker interface 110 through a neural network is able to recognize the spatial orientation of the fiducial 120 such that the camera 135 is still able to recognize the barcode 215 even when the fiducial 120 is positioned at an angle that is not flat relative to the viewing angle of the camera 135.

Figure 12:
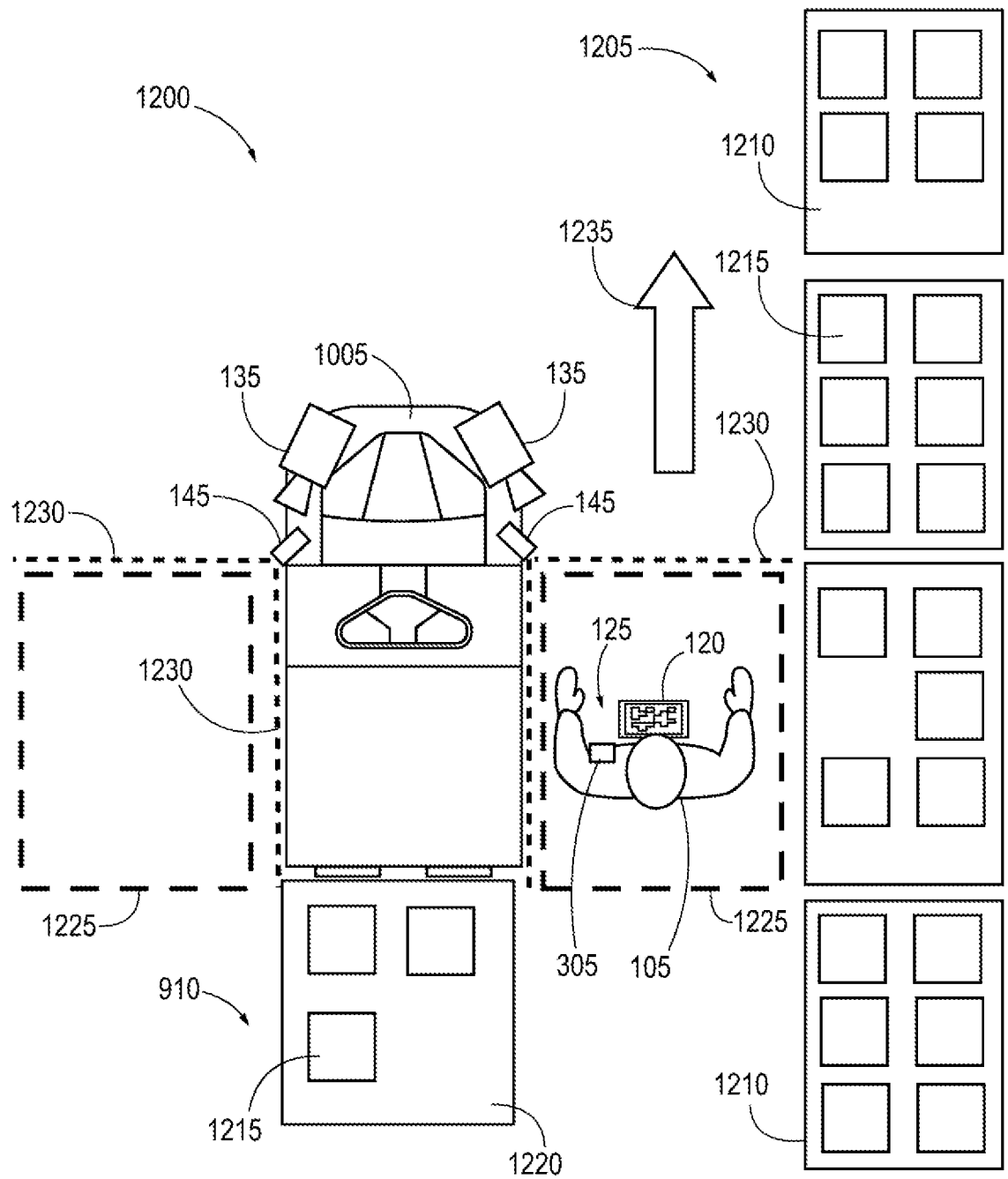
FIG. 12 is a top view of a material handling environment in which the system of FIG. 1 is used.

FIG. 12 shows one example of a material handling environment 1200 according to one variation. In this example, the operator 105 is able to use voice commands via the RTU 125 to control the operation of the powered pallet jack 1005. Furthermore, the powered pallet jack 1005 is able to visually track the movement and follow the movement of the operator 105 via the fiducial 120.

As shown, the material handling environment 1200 includes at least one storage aisle 1205 with one or more storage areas 1210 in which one or more items 1215 are stored. While the illustrated example shows a single storage aisle 1205, it should be recognized that the material handling environment 1200 in most examples includes multiple storage aisles 1205. The items 1215 stored in the storage areas 1210 can come in many forms, such as boxes, bags, bales, drums, cartons, and other types of storage structures. In this example, the operator 105 moves the items 1215 between the storage areas 1210 and the powered pallet jack 1005. The forks 910 of the powered pallet jack 1005 in this illustrated example supports or carries a pallet 1220 that is configured to carry one or more of the items 1215. The operator 105 for example can move the items 1215 from the pallet 1220 of the powered pallet jack 1005 into a particular storage area 1210. Conversely, the operator 105 can also remove the items 1215 from the storage areas 1210 and stack the items 1215 onto the pallet 1220 of the powered pallet jack 1005.

In the depicted example, the powered pallet jack 1005 has at least two cameras 135 mounted on opposing lateral sides of the powered pallet jack 1005. This allows the visual tracker controller 130 of the visual tracker interface 110 to monitor both sides of the powered pallet jack 1005 via the cameras 135. The cameras 135 monitor the presence of the fiducial 120 worn by the operator 105 within an advance zone 1225. As long as the fiducial 120 on the operator 105 is visible within the advance zone 1225, the powered pallet jack 1005 will follow the movement of the operator 105. Once the operator 105 is outside of the advance zone 1225 or not visible within the advance zone 1225, the powered pallet jack 1005 ignores any movement by the operator 105. For example, the operator 105 may leave the advance zone 1225 to pick one or more items 1215 from a particular storage area 1210. While within the advance zone 1225, the fiducial 120 may not be visible to the camera 135 for example when the operator 105 turns away from the camera 135 so as to pick items 1215 from the storage areas 1210.

The powered pallet jack 1005 in FIG. 12 further includes at least two light sources 145 located on the opposite lateral sides of the powered pallet jack 1005. The light sources 145 in one example are in the form of laser beam generators. In this example, the light sources 145 shine one or more guide beams 1230 that are indicative of the advance zone 1225. The guide beams 1230 are typically shown on the floor of the material handling environment 1200 as this allows the operator 105 to readily visualize the advance zone 1225 so as to further promote safety and case of operation of the powered pallet jack 1005. The guide beams 1230 can further have different colors to indicate different statuses of the powered pallet jack 1005. For example, the guide beams 1230 can appear red to indicate danger or other type of condition requiring a warning. Conversely, the guide beams 1230 can shine green to indicate that the current status is proper or safe.

In this example, the operator 105 again wears both the fiducial 120 and the RTU 125. With this setup, the system 100 allows the operator 105 to control the powered pallet jack 1005 in a hands-free manner in a number of ways. For example, the powered pallet jack 1005 when in an autonomous mode, can follow the operator 105 as the operator 105 moves in the advance zone 1225, as is indicated by arrow 1235. While still within the advance zone 1225, the operator 105 can issue a voice command via the voice controller 305 to for example stop the powered pallet jack 1005 to better position the powered pallet jack 1005 for the particular material handling operation. Moreover, this approach adds additional safety as the operator 105 can verbally stop movement of the powered pallet jack 1005 when needed. Moreover, the voice controller 305 still allows remote manual control or an emergency stop via the control button 320 (FIG. 5).

A technique for switching between a manual mode and an autonomous mode (or semi-autonomous mode) of the vehicle 115 in the system 100 will now be described with respect to a flowchart 1300 in FIG. 13 as well as FIGS. 1 and 8. In this example, the system 100 only accepts and/or performs autonomous commands when in the autonomous mode. This helps avoid the potential risks of the powered pallet jack 1005 operating when not intended, which in turn can reduce the risk of accidents. In stage 1305, the vehicle control system 165 of the vehicle 115 starts in a manual mode. The APM 805 or other controller in the vehicle control system 165 determines the status of the auto/manual switch 840 in stage 1310. If the auto/manual switch 840 is not positioned so as to indicate an autonomous mode for the powered pallet jack 1005, the vehicle control system 165 proceeds to stage 1305. Upon the operator 105 actuating the auto/manual switch 840 to indicate that the powered pallet jack 1005 should be in the autonomous mode, the vehicle control system 165 in stage 1310 then proceeds to stage 1315. The system 100 continues to check the status of the auto/manual switch 840 to see if the vehicle 115 should remain within the autonomous mode in stage 1310. Once more in the autonomous mode, the vehicle 115 is able to be autonomously or semi-autonomously controlled via the fiducial 120 and/or the RTU 125.

Figure 14:
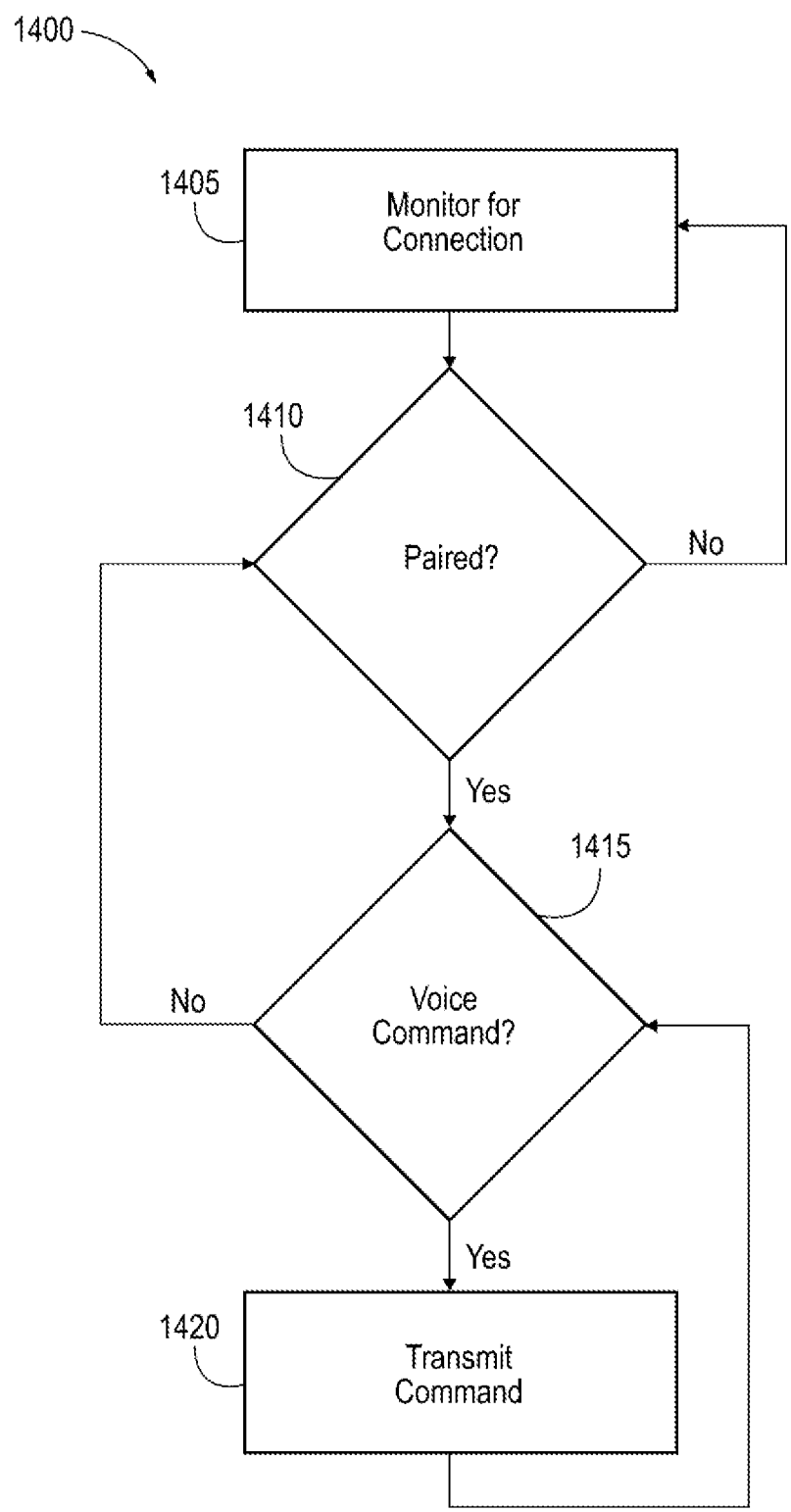
FIG. 14 is a flowchart illustrating a technique for voice controlling a vehicle in the system of FIG. 1.

A technique for controlling the vehicle 115 through voice commands will now be described with reference to a flowchart 1400 in FIG. 14. To provide context for the description, this technique will be described with reference to FIGS. 1, 3, 5, 7, 8, and 12. Referring to FIGS. 3, 7, and 14, the visual tracker controller 130 of the visual tracker interface 110 via communications with the CAN transceiver 740 of the remote radio unit 160 monitors to see whether the voice controller 305 has paired with the WPAN transceiver 750 of the vehicle 115. At the same time, the RTU module 310 in the voice controller 305 determines whether pairing has occurred. In one example, pairing occurs in a fashion that is common with the Bluetooth® standard. For example, the operator 105 can press the pairing button 315 on the voice controller 305 in order to initiate the pairing process. In stage 1410, once the voice controller 305 is paired with the vehicle 115, the RTU module 310 monitors the status of the microphone 330 and/or headset jack 345 to see if a wake word and/or voice command is received in stage 1415. On the other hand, if the voice controller 305 is not paired, the RTU module 310 continued to monitor for pairing in stage 1405 and stage 1410.

Once more, the RTU module 310 of the voice controller 305 monitors the microphone 330 and/or the headset jack 345 to determine whether a wake word and/or voice command was received in stage 1415. To enhance safety all of the voice command processing occurs locally on the voice controller 305 in one example. In other examples, some of the voice processing can be offloaded to a remote server, but by having the processing of the voice commands occur locally on the RTU module 310 of the voice controller 305, safety is enhanced in case there is a disruption in any local communications. Moreover, less power is used as lower powered short range communication techniques or protocols can be used to communicate between the voice controller 305 and the vehicle 115. In most cases, the voice commands are limited to a few of the voice commands that correspond to established system commands that were used by the older handheld remote-control versions of the system. However, additional processing can be used to combine the commands to perform complex actions that are then transmitted to the vehicle 115. To enhance safety, a wake word may be required in conjunction with a voice command to perform certain actions. For example, in order to move the vehicle 115, a wake word may be required before the voice command to move the vehicle 115 is accepted. A wake word can be any type of word, but in some cases, it is preferable to use a word that is not commonly used in material handling situations and/or for controlling vehicle movement. For instance, one wake word could be a unique brand name, the name of the equipment, and/or the vehicle 115 being controlled. On the other hand, commands that are used to prevent injury such as a stop command, may not require a wake word in certain situations. For example, if the vehicle 115 is moving, the voice controller 305 can accept a stop command to immediately stop the vehicle 115 without the need for any type of wake word.

As noted before, the RTU module 310 of the voice controller 305 can locally process the voice commands using machine learning techniques. If a voice command is recognized in stage 1415, the RTU module 310 converts the command to one of the stock, vehicle control commands recognized by the vehicle 115. Some examples of voice commands can include stop, move, halt, turn, and the like which impact the movement of the vehicle 115. Once the voice command is recognized in stage 1415 and the command is converted, such as via a lookup table and/or using artificial intelligence, the voice controller 305 transmits the command wirelessly to the WPAN transceiver 750 in the remote radio unit 160 of the vehicle 115. Based on the command, the vehicle 115 operates accordingly. For example, if a stop command is issued, the vehicle 115 stops moving. As another example, if a move forward command is issued, the vehicle 115, such as the powered pallet jack 1005, moves forward along the storage aisle 1205 or elsewhere. Another example of a voice command is to instruct the vehicle 115 to move in a reverse direction. Other commands can include specifying the speed and/or if the vehicle 115 should turn in certain cases. Upon transmitting the command in stage 1420, the RTU module 310 of the voice controller 305 continues to monitor for voice commands in a similar fashion as described above. It should be noted that the actions that occur in the voice control process illustrated by the flowchart 1400 and FIG. 14 typically only occur when the vehicle 115 is in an autonomous mode, and such voice commands are not accepted when the vehicle 115 is in a manual mode, such as was described above with respect to FIG. 13.

A technique for monitoring the movement of the operator 105 and for controlling the movement of the vehicle 115 through the fiducial 120 will now be described with reference to flowchart 1500 in FIG. 15. For explanation purposes, the technique will be described with reference to FIGS. 1, 11, and 12, but it should be recognized that this technique can be used in other types of work environments and system designs. In stage 1505, the visual tracker controller 130 via the cameras 135 monitor the advance zone 1225 for the fiducial 120.

In stage 1510, the visual tracker controller 130 of the visual tracker interface 110 determines whether or not the barcode 215 of the fiducial 120 is detected. In this example, one or more ArUco markers are used as the barcode 215 on the fiducial 120. It was found that ArUco marker tracking has a depth tolerance within about +5 mm when camera calibration is used. Moreover, ArUco markers provide six-dimensional (6D) pose estimation of the fiducial 120 with respect to the camera 135. In one form, the barcode 215 is specific to the vehicle 115 being controlled. For example, the barcode 215 can represent a unique serial number that can only be used with the specific vehicle 115 being controlled. If the barcode 215 that is specific for the vehicle 115 is not detected in stage 1510, the visual tracker controller 130 of the visual tracker interface 110 continues monitoring for the barcode 215 in stage 1505. When the barcode 215 with the correct identifier is recognized in stage 1510, the visual tracker interface 110 via the cameras 135 monitors to see if the fiducial 120 moves in a specific direction. Movement can be detected in a number of ways. For example, detection of movement can occur based on the relative size of the fiducial 120 viewed by the camera 135 and/or based on training via machine learning techniques. If no movement is detected, the visual tracker interface 110 continues to monitor to make sure that the fiducial 120 remains detected in stage 1510 and that the fiducial 120 is still located within the advance zone 1225 (FIG. 12).

Typically, but not always, the field of view of the camera 135 corresponds to the advance zone 1225, but in other examples, the advance zone 1225 is smaller than the field of view for the camera 135. If the fiducial 120 is outside of the advance zone 1225, then the visual tracker interface 110 does not respond to movement of the fiducial 120 worn by the operator 105. Once the fiducial 120 worn by the operator 105 is outside the advance zone 1225, the powered pallet jack 1005 stops moving. Likewise, if the operator 105 turns in such a way that the fiducial 120 is not visible to the camera 135 and/or the fiducial 120 is covered by something, like one of the items 1215, the powered pallet jack 1005 stops moving. This allows the operator to pick or otherwise handle items 1215 to or from the powered pallet jack 1005 while the powered pallet jack 1005 remains stationary.

Again, if no movement is detected, the visual tracker controller 130 of the visual tracker interface 110 via the cameras 135 continues to monitor to make sure that the barcode 215 of the fiducial 120 is still being detected in stage 1510. When movement of the fiducial 120 is detected in stage 1515, such as indicated by the arrow 1235 in FIG. 12, the visual tracker controller 130 determines the direction and velocity of the movement of the fiducial 120 worn by the operator 105 within the advance zone 1225. The visual tracker controller 130 of the visual tracker interface 110 converts this movement information into one of the stock, vehicle control commands for controlling the powered pallet jack 1005. For example, a vehicle control command may include move forward or move backwards commands (or turn commands). Other vehicle control commands can include a stop command when the operator 105 stops moving or a velocity/speed command.

Referring to FIG. 8, the visual tracker controller 130 via the CAN bus 720 transmits the command to the remote radio unit 160 of the vehicle 115 in stage 1520. Upon transmitting the command, the visual tracker controller 130 of the visual tracker interface 110 monitors again for movement in stage 1515. The process continues in a similar fashion until the operator 105 wearing the fiducial 120 moves outside of the advance zone 1225 or the fiducial 120 is not visible in which case the visual tracker controller 130 instructs the powered pallet jack 1005 to stop moving. The process again can be also stopped upon the operator switching the powered pallet jack 1005 to a manual mode such as was described above with respect to the flowchart 1300 in FIG. 13.

While the system 100 has been described as being a retrofit into a pre-existing vehicle control system 165 of the vehicle 115, it should be recognized that certain aspects or features of the system 100 can be fully integrated into the vehicle 115 as an original equipment manufacturer component. Once more, having this ability to upgrade pre-existing systems to voice and/or visual control type system is a less expensive and quicker proposition in certain cases without requiring the wholesale redesign of the vehicle control system 165.

Figure 13:
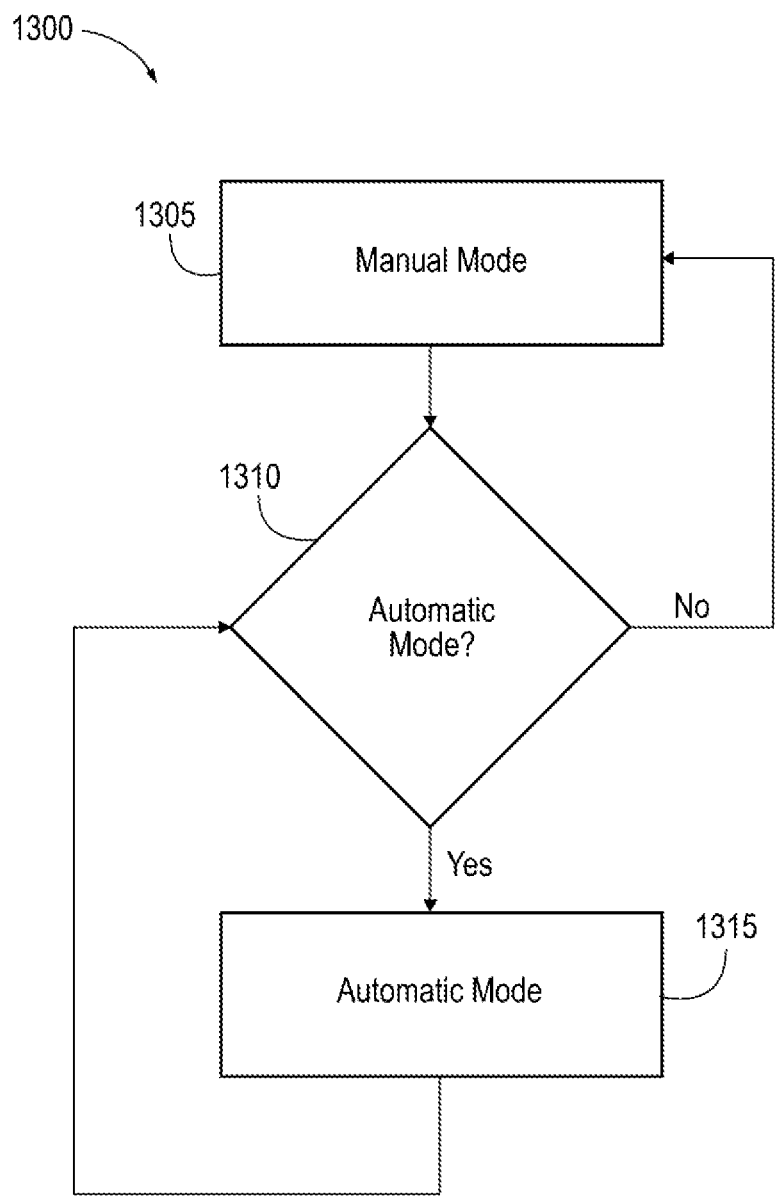
FIG. 13 is a flowchart illustrating a technique for switching between manual and automatic modes in the system of FIG. 1.
Figure 15:
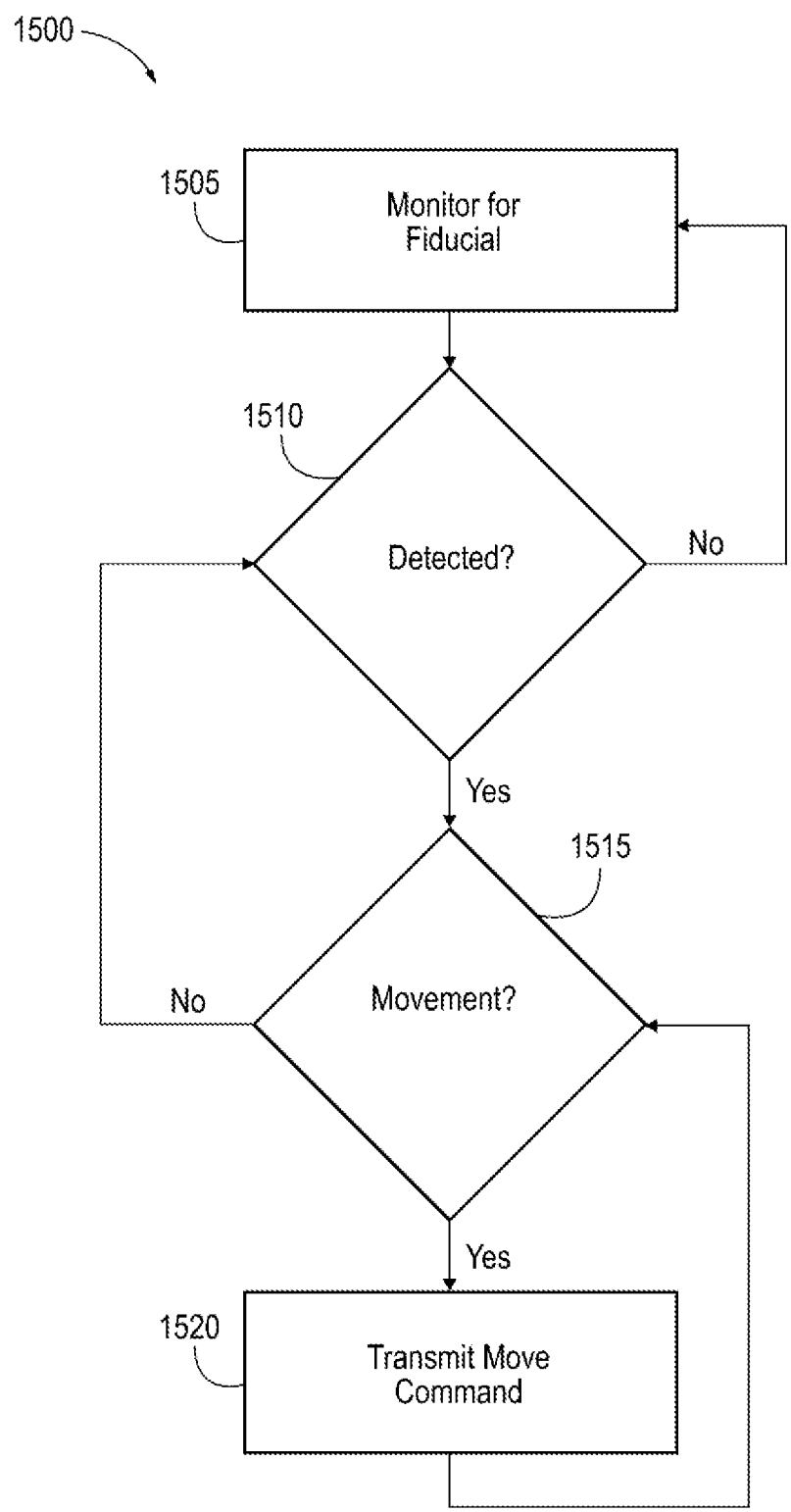
FIG. 15 is a flowchart illustrating a technique for visually controlling the vehicle in the system of FIG. 1.

The techniques illustrated in FIGS. 13, 14, and 15 in most cases occur concurrently. However, there are some designs where only the voice control or the visual control hands-free control systems are used. Having this hands-free control capability again helps to simplify and speed up the material handling process as the operator 105 does not have to deal with manual hand controls and the issues associated with such controls.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along an electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical, horizontal, or any combination thereof. Antennas may also be configured to radiate electromagnetic energy within a specific range of vertical angles (i.e. takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Artificial intelligence" or "AI" generally refers to the ability of machines to perceive, synthesize, and/or infer information. AI may enable a machine to perform tasks which normally require human intelligence. For example, AI may be configured for speech recognition, visual perception, decision making, language interpretation, logical reasoning, and/or moving objects. Typically, AI is embodied as a model of one or more systems that are relevant to tasks that a machine is configured to perform. AI models may be implemented on a device, such as a mechanical machine, an electrical circuit, and/or a computer. AI models may be implemented in an analog or digital form and may be implemented on hardware or software. The implementation of AI may also utilize multiple devices which may be connected in a network.

"ArUco Marker" or "Augmented Reality University of Cordoba Marker" refers to a type of fiducial marker that are black and white, square-shaped fiducial markers. ArUco markers are commonly used in augmented reality, robot navigation, and camera calibration. The ArUco marker has a unique identifier (ID) in the form of a black and white pattern for distinguishing between different ArUco markers. The black and white pattern is commonly in the form of a binary pattern on a 7×7 grid. In one form, the ArUco fiducial marker is a binary square with black background and a back boundary, and a white generated pattern is located within the boundary that uniquely identifies the ArUco marker.

"Barcode" generally refers to a visible arrangement of shapes, colors, lines, dots, or symbols fixed in some medium and arranged on the medium in a pattern configured to encode data. Examples include optical machine-readable representations of data relating to an object to which the barcode is attached such as a Universal Produce Code (UPC), or any visible patterns related to any type of Automatic Identification and Data Capture (AIDC) system. Another example of a barcode is a Quick Response Code (QR Code) which arranges various light and dark shapes to encode data. In still yet another example, the barcode is an ArUco marker. Any suitable medium is envisioned. Examples include an adhesive label, a physical page, a display device configured to display the barcode, or any other object such as a box, a machine, or other physical structure to which the barcode is affixed or upon which it is printed. For example, a barcode may be etched into metal, machined into plastic, or formed by organizing visible three-dimensional shapes into a pattern. The barcode may not be visible to humans but may be fixed using a substance or device that allows the barcode to be visible to sensors in a machine configured to read wavelengths of light outside those detectable by the human eye. Examples of this type of barcode include barcodes printed with ink that is only visible under ultraviolet (i.e., "black") light, or barcodes displayed using infrared light.

"Battery" generally refers to a device that converts chemical energy into electrical energy. The battery stores energy in chemical form and then discharges the energy by converting chemical energy into electricity. The battery generally includes one or more electrochemical cells and terminals. The terminals usually include an anode and a cathode.

"Cable" generally refers to one or more elongated strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongated strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Camera" generally refers to a device that records visual images. Typically, a camera may record two- and/or three-dimensional images. In some examples, images are recorded in the form of film, photographs, image signals, and/or video signals. A camera may include one or more lenses or other devices that focus light onto a light-sensitive surface, for example a digital light sensor or photographic film. The light-sensitive surface may react to and be capable of capturing visible light or other types of light, such as infrared (IR) and/or ultraviolet (UV) light.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network interface to perform various network communications upon request. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. A computer may include one or more physical processors or other computing devices or circuitry and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of a disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

"Controller" generally refers to a device, using mechanical, hydraulic, pneumatic electronic techniques, and/or a microprocessor or computer, which monitors and physically alters the operating conditions of a given dynamical system. For example, the controller may be configured to control the behavior of another mechanical and/or electronic device. A controller may include a "control circuit" configured to provide signals or other electrical impulses that may be received and interpreted by the controlled device to indicate how the controlled device should behave. A controller may include a processor for performing calculations to process input or output. A controller may include a memory for storing values to be processed by the processor, or for storing the results of previous processing. A controller may also be configured to accept input and output from a wide array of input and output devices for receiving or sending values. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general-purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Fastener" generally refers to a hardware device that mechanically joins or otherwise affixes two or more objects together. By way of non-limiting examples, the fastener can include bolts, dowels, nails, nuts, pegs, pins, rivets, screws, buttons, hook and loop fasteners, and snap fasteners, to just name a few.

"Fiducial" or "Fiducial Marker" generally refers to a reference point that helps to align, measure, and/or track something, such as an object. The fiducial can come in many forms. For example, the fiducial can include one or more dots, circles, squares, and/or complex patterns. The fiducial is typically designed to be readily imaged by an imaging system, like a camera, and be distinguishable from the surroundings.

"Forklift Truck", "Forklift", or "Fork Truck" generally refers to a vehicle with one or more prongs, blades, forks, or other parts that can be slid into or under loads and then raised or lowered in order to move and/or stack the loads. In a common arrangement, the forklift truck has two forks that can be slid into a pallet that carries a load. The forks are typically raised and lowered along a forklift mast. In certain designs, the mast and/or forks can be tilted so as to better retain the carried load. The forklift truck can be operated by a human operator, semi-autonomously controlled, or even fully autonomous. In one example of a fully autonomous design, the forklift truck is an Autonomously Guided Vehicle (AGV). Forklift trucks can be used in a wide variety of environments, such as in warehouses, lumberyards, manufacturing plants, and shipping depots, to name just a few examples. The forklift trucks can be powered in several manners, such as by using internal combustion engines (e.g., with liquefied petroleum gas, or LPG), via battery-electric powerplants, and/or hydrogen fuel cells. Some non-limiting forklift truck design types include low lift trucks, stackers, reach trucks, side loaders, order-picking trucks, guided very-narrow-aisle trucks, articulated counterbalance trucks, and omnidirectional trucks, to name just a few.

"Hook and Loop Fastener" generally refers to two separated components, the hooks and the loops. When the hooks and loops are pressed together, the hooks capture the loops and create a removable connection. To separate the hooks and the loops, a pulling or peeling force is required. Hook and loop fasteners may come in a variety of shapes and sizes. For example, the hook and loop fasteners may be rectangular, circular, and/or a variety of other shapes depending on the use case. Generally, hook and loop fasteners are secured to opposing surfaces via an adhesive and/or sewing.

"Housing" generally refers to a component that covers, protects, and/or supports another thing. A housing can have a unitary construction or made of multiple components. The housing can be made from the same material or a combination of different materials. The housing can include a protective cover designed to contain and/or support one or more mechanical components. Some non-limiting examples of a housing include a case, enclosure, covering, body, and shell.

"Image" generally refers to a visual representation. The visual representation can for example be of an object, scene, person, and/or abstraction. The image can be in the form of a static picture or can include multiple images in the form of a dynamic video showing motion.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Item" generally refers to an individual article, object, or thing. Commonly, but not always, items are handled in warehouse and material handling environments. The item can come in any form and can be packaged or unpackaged. For instance, items can be packaged in cases, cartons, bags, drums, containers, bottles, cans, pallets, and/or sacks, to name just a few examples. The item is not limited to a particular state of matter such that the item can normally have a solid, liquid, and/or gaseous form for example.

"Light Emitting Diode" or "LED" generally refers to a semiconductor diode, made from certain materials, in which light is emitted in response to application of an electrical current. A variety of materials in the LED can produce a range of colors. The color of the light (corresponding to the energy of the photons) is determined by the energy required for electrons to cross the band gap of the semiconductor. Typically, but not always, white light is obtained by using multiple semiconductors or a layer of light-emitting phosphor on the semiconductor device. The LED can come in the form of a variety of colors, shapes, sizes and designs, including with or without heat sinking, lenses, or reflectors, built into the package.

"Machine Learning" or "Machine Learning Algorithm" generally refers to a way of developing methods for performing tasks within artificial intelligence (AI) systems. Machine learning algorithms build models based on given sets of sample data. Using these models, a machine learning algorithm may make predictions or decisions about performing tasks and may improve the ability of an AI system to perform those tasks. Examples of machine learning include supervised learning, unsupervised learning, reinforcement learning, deep learning, and statistical learning. Machine learning algorithms can be implemented on a device, for example a computer or network of computers. Implementations of machine learning may also incorporate various types of models, including artificial neural networks, decision trees, regression analysis, Bayesian networks, gaussian processes, and/or genetic algorithms.

"Machine-Readable Identifier" generally refer to a marking, structure, and/or device that is readable by an electronic device such as by a computer with an optical and/or electromagnetic scanner. Typically, but not always, the machine-readable identifier identifies the object and/or some property of the object to which the machine-readable identifier is associated. Unless great effort is used, the machine-readable identifier is not easily read and/or understood by a human being. Some examples of machine-readable identifiers include barcodes, Quick Response (QR) codes, and/or Radio-Frequency Identification (RFID) tags, to name just a few.

"Memory" generally refers to any storage system or device configured to retain data or information. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

"Microphone" generally refers to a transducer that converts sound into an electrical signal.

"Neural Network" or "Artificial Neural Network" generally refers to a model composed of multiple nodes. Each node receives a signal from one or more inputs or other nodes. Each node may also perform an operation on the received signal. Each node then sends a signal to one or more other nodes or outputs. The nodes may be arranged in layers such that one or more signals travels across the layers sequentially. The neural network may be given data that trains the neural network. The neural network may be trained to perform a variety of tasks, for example to recognize objects in an image, recognize patterns in a sequence, replicate motion, and/or approximate a function.

"Operatively Coupled" generally refers to a connection where at least two devices and/or structures are directly or indirectly connected to communicate with one another, be secured together, and/or function together. For instance, the devices can be connected through a wired and/or wireless connection in order to exchange data, commands, and/or other types of information. The devices can be directly connected together or indirectly connected together through a third-party device. In one case, electrical current can flow between the devices through electrically conductive wire, and in other cases, other types of electromagnetic radiation, such as visible light and radio waves, can be exchanged through various media, such via fiber optic cable. When operatively coupled, the devices and/or structures can be physically connected to one another via a direct connection or an indirect connection, such as via fasteners, adhesives, and/or mechanical linkages, to name just a few examples.

"Original Equipment Manufacturer" or "OEM" generally refers to an organization that makes finished devices from component parts bought from other organizations that are usually sold under their own brand in a consumer or commercial market.

"Pallet" generally refers to a portable platform or other structure on which goods or items can be assembled, stacked, stored, packaged, handled, transported, and/or moved, such as with the aid of a forklift or pallet jack, as a unit load. Typically, but not always, the pallet is rigid and forms a horizontal base upon which the items rest. Goods, shipping containers, and other items are often placed on a pallet secured with strapping, stretch wrap, and/or shrink wrap. Often, but not always, the pallet is equipped with a superstructure. In one form, the pallet includes structures that support goods in a stable fashion while being lifted by a forklift, pallet jack, front loader, and/or other lifting devices. In particular, pallets typically include a top, load deck upon which items are stacked, a bottom, support deck that rests on the ground, and a spacer structure positioned between the load and support decks to receive the forks of the forklift or pallet jack. However, the pallets can be configured differently. For example, the term pallet is used in a broader sense to include skids that have no support deck. One or more components of the pallet, or even the entire pallet, can be integrally formed together to form a single unit. By way of non-limiting examples, these pallets can include stringer, block, perimeter, skid, solid deck, multiple deck board, panel-deck, slave, double-deck (or face), single-way entry, two-way entry, four-way entry, flush, single-wing, double-wing, expendable, limited-use, multiple-use, returnable, recycled, heat treated, reversible, non-reversible, and/or warehouse type pallets.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Supply" generally refers to an electrical device that provides electrical power to an electrical load, such as electrical machines and/or electronics.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement. The concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g., "true" or "false"). Processing activities may occur in multiple single processors on separate servers, on multiple processors in a single server with separate processors, or on multiple processors physically remote from one another in separate computing devices.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Short-range communication" generally refers to any network that is capable of transmitting data over short distances using high-frequency electromagnetic radiation. Some examples of short-range communication protocols include, but are not limited to BLUETOOTH®, Wi-Fi, RFID, and ZigBee®.

"Snap Fastener" generally refers to a fastening device including a male portion and a female portion. The male portion typically includes a protrusion or ball on one component, while the female portion typically includes a recess or a socket configured to accept and secure the male portion. Typically, a snap fastener is mated together by a pushing force and separated by a pulling force.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Vehicle" generally refers to a machine that transports people and/or cargo. Common vehicle types can include land-based vehicles, amphibious vehicles, watercraft, aircraft, and space craft. By way of non-limiting examples, land-based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vehicle control system" generally refers to hardware and/or software responsible for issuing commands to various vehicle components. The components may activate steering, throttle, braking, or other operations related to vehicle movement. The vehicle components may also perform power distribution, energy storage, lighting, heating, cooling, monitoring, or communications among other functions. A vehicle control system may base commands on manual or automated inputs. A vehicle control system may also exchange information with the vehicle components.

"Wireless Personal Area Network" or "WPAN" generally refers to a low-powered electromagnetic network used for data transmission between devices, such as computers, telephones, electronics, and/or portable devices, that is carried over a short-distance using network technology with a range of a few centimeters to a few meters. WPAN is based in part on the IEEE 802.15 standard. Two common types of wireless technologies are typically used for WPAN, BLUETOOTH® and Infrared Data Association (IrDA) technologies. BLUETOOTH® technology typically uses short-range radio waves, and in some instances, can form longer range mesh networks. IrDA technology typically uses infrared light for communication. Non-limiting examples of WPAN include INSTEON, IrDA, Wireless USB, BLUETOOTH®, Thread, Z-Wave®, and ZigBee® wireless communication protocols and technologies.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

REFERENCE NUMBERS 100 system
105 operator
110 visual tracker interface
115 vehicle
117 operator control
120 fiducial
125 RTU
130 visual tracker controller
135 camera
140 speaker
145 light source
150 sensor 155 I/O device
160 remote radio unit
165 vehicle control system
205 safety vest
210 fasteners
215 barcode
305 voice controller
310 RTU module
315 pairing button
320 control button
325 RTU I/O device
330 microphone
335 LED
340 speaker
345 headset jack
350 charging port
405 RTU board
410 voice control board
415 battery
420 housing
505 headset plug
510 headset cable
605 computer
610 network interface card
615 LEDs
705 VT board
710 RRU board
715 power cable
720 CAN bus
725 connector
730 voltage regulator
735 power rail
740 CAN transceiver
745 safety controller
750 WPAN transceiver
755 WPAN antenna
760 NFC transceiver
765 NFC antenna
805 APM
810 CAN expansion module
815 brake switch relay
820 LSU
825 selection button
830 status indicator
835 spare output
840 auto/manual switch
845 power relay
850 power supply
855 power bus
860 vehicle systems
905 powered pallet jack
910 forks
1005 powered pallet jack
1105 coordinate axis
1200 material handling environment
1205 storage aisle
1210 storage areas
1215 items
1220 pallet
1225 advance zone
1230 guide beams
1235 arrow
1300 flowchart
1305 stage
1310 stage
1315 stage
1400 flowchart
1405 stage
1410 stage
1415 stage
1420 stage
1500 flowchart
1505 stage
1510 stage
1515 stage
1520 stage

What is claimed is:

1. A system, comprising:
a vehicle control system including a processor configured to receive a hands-free command from an operator of a vehicle during a material handling activity with the vehicle;
wherein the processor is configured to change motion of the vehicle in response to the hands-free command;
an operator control configured to control the vehicle via visual control;
wherein the vehicle is configured to follow movement of an operator via the operator control;
wherein the operator control includes a fiducial;
at least two cameras being located on opposite sides of the vehicle; and
wherein the cameras are configured to capture one or more images of the fiducial.

2. The system of claim 1, wherein the operator control is configured to control the vehicle via voice control.

3. The system of claim 2, wherein:
the vehicle includes a remote receiver unit (RRU);
the operator control includes a voice controller; and
the voice controller is configured to communicate with the remote receiver unit via a wireless connection.

4. The system of claim 3, wherein:
the voice controller includes a microphone configured to receive one or more voice commands; and
the voice controller is configured to convert the voice commands to vehicle control commands that are generated by a hand-operated remote control.

5. The system of claim 4, wherein:
the voice controller includes a remote terminal unit (RTU) module;
the RTU module is operatively coupled to the microphone;
the RTU module is configured to mimic the vehicle control commands that are generated by the hand-operated remote control; and
the voice controller is configured to transmit the vehicle control commands to the remote receiver unit to control the vehicle.

6. The system of claim 5, wherein:
the remote receiver unit includes a wireless personal area network (WPAN) transceiver; and
the RTU module is configured to communicate with the WPAN transceiver via a wireless personal area network (WPAN).

7. The system of claim 3, wherein the voice controller includes a pairing button configured to pair the voice controller with the remote receiver unit via a wireless personal area network (WPAN) protocol.

8. The system of claim 3, wherein the voice controller includes a stop button configured to stop the vehicle when actuated.

9. The system of claim 3, wherein the voice controller is configured to be worn by the operator vocalizing voice commands.

10. The system of claim 1, wherein the fiducial includes a barcode.

11. The system of claim 1, wherein the fiducial is configured to pair to the vehicle to prevent unintended operation of the vehicle.

12. The system of claim 1, wherein the fiducial includes an augmented reality University of Cordoba (ArUco) marker.

13. The system of claim 1, wherein the fiducial is located on clothing worn by the operator.

14. The system of claim 1, further comprising:
a visual tracker interface including one or more cameras;
wherein the cameras are configured to capture one or more images of the fiducial;
wherein the visual tracker interface includes a visual tracker controller; and
wherein the cameras are operatively coupled to the visual tracker controller.

15. The system of claim 14, wherein:
the vehicle includes a remote receiver unit (RRU);
the visual tracker controller is configured to convert the images of the fiducial to one or more vehicle control commands; and
the visual tracker controller is configured to send the vehicle control commands to the remote receiver unit.

16. The system of claim 14, wherein the visual tracker interface is configured to convert the images to vehicle control commands that are generated by a hand-operated remote control.

17. The system of claim 16, wherein the visual tracker controller is configured to mimic the vehicle control commands that are generated by the hand-operated remote control.

18. The system of claim 14, wherein:
the cameras are configured to view an advance zone; and
the visual tracker controller is configured to only track motion of the fiducial when in the advance zone.

19. The system of claim 18, wherein:
the visual tracker interface includes one or more light sources;
the light sources are operatively coupled to the visual tracker controller; and
the light sources are configured to shine light indicative of the advance zone.

20. The system of claim 14, further comprising:
wherein the vehicle includes a remote receiver unit (RRU); and
a controller area network (CAN) operatively coupling the visual tracker controller to the remote receiver unit.

21. The system of claim 1, wherein the vehicle is configured to be controlled via both voice control and visual control.

22. The system of claim 1, wherein the vehicle includes a powered pallet jack.

23. A method, comprising:
receiving a hands-free command from an operator of a vehicle during a material handling activity with the vehicle;
changing motion of the vehicle in response to the hands-free command;
wherein the receiving the hands-free command includes viewing a state of a fiducial on the operator with a camera;
wherein the state of the fiducial includes presence of the fiducial within an advance zone; and
shining light with a light source to create a shape that is indicative of the advance zone.

24. The method of claim 23, further comprising:
wherein the receiving the hands-free command includes listening to a voice command from the operator with a voice controller;
converting the voice command to one or more vehicle control commands with the voice controller; and
transmitting the vehicle control commands from the voice controller to a remote receiver unit RRU) of the vehicle.

25. The method of claim 24, further comprising:
wherein the vehicle control commands mimic those issued by a hand-operated remote control; and
recognizing with the remote receiver unit only the vehicle control commands.

26. The method of claim 23, further comprising:
wherein the state of the fiducial includes visibility of the fiducial with the camera; and
stopping the vehicle when the fiducial is not visible to the camera.

27. The method of claim 23, further comprising:
wherein the state of the fiducial includes movement of the fiducial; and
moving the vehicle when the fiducial moves.

28. The method of claim 27, further comprising:
matching velocity of the vehicle with velocity of the fiducial.

29. The method of claim 23, further comprising:
moving the vehicle when the camera views the fiducial in the advance zone.

30. The method of claim 23, further comprising:
stopping the vehicle when the camera does not view the fiducial in the advance zone.

31. The method of claim 23, further comprising:
capturing one or more images of the fiducial with the camera;
converting the images to one or more vehicle control commands with a visual tracker controller; and
transmitting the vehicle control commands from the visual tracker controller to a remote receiver unit (RRU) of the vehicle.

32. The method of claim 31, further comprising:
wherein the vehicle control commands mimic those issued by a hand-operated remote control; and
recognizing with the remote receiver unit only the vehicle control commands.

33. A system, comprising:
a vehicle control system including a processor configured to receive a hands-free command from an operator of a vehicle during a material handling activity with the vehicle;
wherein the processor is configured to change motion of the vehicle in response to the hands-free command;
an operator control configured to control the vehicle via visual control;
wherein the vehicle is configured to follow movement of the operator via the operator control;
wherein the operator control includes a fiducial;
a visual tracker interface including one or more cameras;
wherein the cameras are configured to capture one or more images of the fiducial;
wherein the visual tracker interface includes a visual tracker controller;
wherein the cameras are operatively coupled to the visual tracker controller;
wherein the cameras are configured to view an advance zone; and wherein the visual tracker controller is configured to only track motion of the fiducial when in the advance zone.

34. The system of claim 33, wherein:
the visual tracker interface includes one or more light sources;
the light sources are operatively coupled to the visual tracker controller; and
the light sources are configured to shine light indicative of the advance zone.

35. The system of claim 33, wherein the fiducial includes a barcode.

36. The system of claim 33, wherein the fiducial is configured to pair to the vehicle to prevent unintended operation of the vehicle.

37. The system of claim 33, wherein the fiducial includes an augmented reality University of Cordoba (ArUco) marker.

38. The system of claim 33, wherein the fiducial is located on clothing worn by the operator.

39. The system of claim 33, wherein:
the vehicle includes a remote receiver unit (RRU);
the visual tracker controller is configured to convert the images of the fiducial to one or more vehicle control commands; and
the visual tracker controller is configured to send the vehicle control commands to the remote receiver unit.

40. The system of claim 33, wherein the visual tracker interface is configured to convert the images to vehicle control commands that are generated by a hand-operated remote control.

41. The system of claim 40, wherein the visual tracker controller is configured to mimic the vehicle control commands that are generated by the hand-operated remote control.

42. The system of claim 33, further comprising:
wherein the vehicle includes a remote receiver unit (RRU); and
a controller area network (CAN) operatively coupling the visual tracker controller to the remote receiver unit.

* * * * *